US011600028B1

(12) United States Patent
Setlur et al.

(10) Patent No.: US 11,600,028 B1
(45) Date of Patent: Mar. 7, 2023

(54) SEMANTIC RESIZING OF LINE CHARTS

(71) Applicant: Tableau Software, LLC, Seattle, WA (US)

(72) Inventors: Vidya Raghavan Setlur, Portola Valley, CA (US); Haeyong Chung, Madison, AL (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/549,754

(22) Filed: Dec. 13, 2021

Related U.S. Application Data

(60) Provisional application No. 63/233,195, filed on Aug. 13, 2021.

(51) Int. Cl.
*G06T 11/20* (2006.01)
*G06T 7/11* (2017.01)
*G06T 3/40* (2006.01)

(52) U.S. Cl.
CPC .............. *G06T 11/206* (2013.01); *G06T 3/40* (2013.01); *G06T 7/11* (2017.01); *G06T 2207/20021* (2013.01); *G06T 2210/12* (2013.01)

(58) Field of Classification Search
CPC .............. G06T 11/206; G06T 3/40; G06T 2207/20021; G06T 7/11; G06T 2210/12
See application file for complete search history.

(56) References Cited

U.S. PATENT DOCUMENTS

| | | | | |
|---|---|---|---|---|
| 9,256,971 | B1* | 2/2016 | Nehring | G06T 15/00 |
| 2004/0204849 | A1* | 10/2004 | Shipley | G01C 21/00 |
| | | | | 340/995.14 |
| 2014/0320539 | A1* | 10/2014 | Hao | G09G 5/373 |
| | | | | 345/661 |
| 2015/0169736 | A1* | 6/2015 | MacPherson | G06F 3/04842 |
| | | | | 715/739 |
| 2016/0078653 | A1* | 3/2016 | Intoppa | G06T 11/206 |
| | | | | 345/589 |
| 2017/0351753 | A1* | 12/2017 | Duncker | G06F 16/338 |
| 2018/0067625 | A1* | 3/2018 | Kim | G06T 11/206 |

* cited by examiner

*Primary Examiner* — Phi Hoang
(74) *Attorney, Agent, or Firm* — Morgan, Lewis & Bockius LLP

(57) ABSTRACT

A computing device generates an initial data visualization according to a visual specification that specifies a data source, a plurality of visual variables, and a plurality of data fields from the data source. The device determines a visualization region based on a display size of the initial data visualization. The device generates a modified data visualization from the initial data visualization according to the determined visualization region, including: (i) identifying a plurality of elements of the initial data visualization, (ii) for each element of the plurality of identified elements, determining a respective semantic weight for the respective element, (iii) grouping the elements into one or more element layers according to the determined semantic weights, (iv) computing spatial metrics for the elements, and (v) executing one or more generalization operations on the elements in accordance with the one or more computed spatial metrics. The computing device displays the modified data visualization.

20 Claims, 28 Drawing Sheets

Jittering

Algorithm 1 Elimination operation

Input: Resized line chart without elimination applied and semantic importance score $S$ for all chart elements.
    Output: Resized line chart with elimination applied.

1: while ! satisfyConstraints do
2:     Perform jittering to ascertain if constraints are satisfied.
3:     Eliminate elements starting with lowest $S$ that overlaps the most with other elements in the chart.
4: end while

Figure 3L 412 (Continued)

418 For each element of the identified plurality of elements, determine a respective semantic weight for the respective element.

420 The respective semantic weight for each element is determined according to a respective element type of the respective element.

421 Each element type is either a data element or a chart element.

422 When a first element is a data element, assign a first semantic weight to the first element.

424 When the element is a chart element, assign a second semantic weight to the first element.

426 The second semantic weight is different from the first semantic weight.

428 When the first element is a data element:

430 Determine whether the first element corresponds to a local extremum, a first data value, or a last data value.

432 When the first element corresponds to a local extremum, a first data value, or a last data value, assign a third semantic weight to the element.

434 The third semantic weight is different from the first semantic weight.

Figure 4B 412 (Continued)

436 Group the plurality of elements into one or more element layers according to the determined semantic weights.

438 Compute one or more spatial metrics for the plurality of elements.

440 The one or more spatial metrics include a data density metric.

444 Divide the visualization region into a plurality of cells.

446 For each cell, compute a respective data density value based on a respective number of identified elements in the respective cell.

448 The one or more spatial metrics include a distance metric.

450 Compute the distance metric by determining distances between elements within an element layer.

452 The one or more spatial metrics include a collision metric.

454 Computing the collision metric includes:

456 Compute a respective bounding box for each element of the plurality of identified elements.

458 For at least some pairs of elements, compute a respective area of overlap of bounding boxes for elements in the respective pair of elements.

470 Execute an elimination operation.

472 For each element of the identified elements, compute a respective score for the respective element based on a respective plurality of assigned weights for the respective element.

474 The respective plurality of assigned weights for the respective element includes the respective semantic weight, a respective local density weight, and a respective overlap weight.

476 Identify one or more elements, from the plurality of elements, whose computed scores are below a predetermined threshold.

478 Remove the identified one or more elements from the initial data visualization.

480 The modified data visualization excludes the one or more identified elements.

482 Execute a simplification operation.

484 Determine a data shape of the initial data visualization.

486 Remove data points from the initial data visualization while preserving the data shape of the initial data visualization.

488 The simplification operation preserves local extremum values, initial data points, and end data points.

490 Execute a merging operation that combines two or more of the plurality of elements.

Figure 4E

SEMANTIC RESIZING OF LINE CHARTS

RELATED APPLICATIONS

This application claims priority to U.S. Provisional Patent Application No. 63/233,195, filed on Aug. 13, 2021, entitled "Semantic Resizing of Line Charts," which is incorporated by reference herein in its entirety.

This application is related to U.S. patent application Ser. No. 16/234,470, filed on Dec. 27, 2018, entitled "Analyzing Underspecified Natural Language Utterances in a Data Visualization User Interface," which is incorporated by reference herein in its entirety.

TECHNICAL FIELD

The disclosed implementations relate generally to data visualization and more specifically to systems, methods, and user interfaces that enable users to interact with data visualizations at a wide range of screen sizes.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface.

In the context of presenting data visualizations, resizing is particularly critical when engaging with a dashboard presented using limited screen real-estate (e.g., on a smart watch or a mobile phone), and/or when visualizations created on one display must then be rendered on a different sized display. A major challenge associated with developing techniques that facilitate resizing and creating multi-scale visualizations is the significant number of variations that must be considered to represent a rescaled visualization effectively. A visualization author may need to represent every detail of the visualization at a given display size, while also taking into account every possible combination of the display properties, such as resolution, size, and aspect ratio.

General resizing techniques such as uniform scaling and scale-and-stretch can be easily applied to resizing a visualization, but they tend to make the visualization illegible and increase the amount of visual clutter at smaller scales. Such resizing also does not consider semantic information that should be conveyed in data. Hence, it is crucial for visualization techniques to support a smarter way to automatically adapt visual representations so that the viewer can read the chart more easily, regardless of the particular display size.

SUMMARY

Cartographic generalization enables one to simplify or eliminate less semantically important features, exaggerate more important ones, and resolve visual clutter to improve information quality on a smaller scale. Route maps have effectively and succinctly applied various forms of generalization. Some literature describes a method of presenting route instructions on a mobile device depending on various situational factors such as limited resources and varying quality of positional information. Although automatic map generalization techniques have been described in the cartographic and geographic literature, little research has been undertaken on how these methods could be extended to other forms of visualization.

Some implementations of the present disclosure extend cartographic generalization to rescale data visualizations (e.g., line charts), so as to preserve the recognizability of semantically important elements in visualizations at different display sizes. Some implementations of the present disclosure introduce a set of spatial metrics to examine geometric properties and relationships among elements in a data visualization. These metrics are used to determine the presence of visual clutter and complexity in a view of the visualization. The present disclosure also describes the development of generalization techniques for semantically resizing line charts to target display sizes based on the metrics.

In accordance with some implementations, a method for resizing data visualizations based on semantics is performed at a computing device. The computing device includes a display, one or more processors, and memory. The memory stores one or more programs configured for execution by the one or more processors. The method includes generating an initial data visualization according to a visual specification that specifies a data source, a plurality of visual variables, and a plurality of data fields from the data source. The method includes determining a visualization region based on a display size of the initial data visualization. The method includes generating a modified data visualization from the initial data visualization according to the determined visualization region, including: (i) identifying a plurality of elements of the initial data visualization; (ii) for each element of the identified plurality of elements, determining a respective semantic weight for the respective element; (iii) grouping the plurality of elements into one or more element layers according to the determined semantic weights; (iv) computing one or more spatial metrics for the plurality of elements; and (v) executing one or more generalization operations on the plurality of elements in accordance with the one or more computed spatial metrics. The method also includes displaying the modified data visualization.

In some implementations, the respective semantic weight for each element is determined according to a respective element type of the respective element. Each element type is one of: a data element or a chart element.

In some implementations, the method further includes: when a first element is a data element, assigning a first semantic weight to the first element. The method also includes, when the first element is a chart element, assigning a second semantic weight to the first element. The second semantic weight is different from the first semantic weight.

In some implementations, the method further includes: when the first element is a data element, determining whether the first element is a local extremum, a first data value, or a last data value. The method further includes, when the first element is a local extremum, a first data value, or a last data value, assigning a third semantic weight to the first element. The third semantic weight is different from the first semantic weight and different from the second semantic weight.

In some implementations, the method further includes, for each element of the identified plurality of elements, computing a respective bounding box for the respective element.

In some implementations, the one or more spatial metrics include a data density metric. Computing the data density metric includes: (i) dividing the visualization region into a plurality of cells, and (ii) for each cell, computing a respective data density value based on a respective number of identified elements in the respective cell.

In some implementations, the one or more spatial metrics include a distance metric. Computing the distance metric includes determining distances between pairs of elements within an element layer.

In some implementations, the one or more spatial metrics include a collision metric. Computing the collision metric includes: (i) computing a respective bounding box for each element of the plurality of identified elements, and (ii) for at least some pairs of elements, computing a respective area of overlap of bounding boxes for elements in the respective set of elements.

In some implementations, the one or more generalization operations include a jittering operation. The method further includes, when the computed area of overlap between a first element and a second element is a positive number, executing the jittering operation so that the first element is displaced from an original position to a modified position.

In some implementations, the one or more spatial metrics include an area ratio metric. Computing the area ratio metric comprises computing a ratio of (1) an area of all the identified elements and (2) an area of the visualization region.

In some implementations, executing the one or more generalization operations includes executing an elimination operation, comprising: (i) for each element of the identified elements, computing a respective score for the respective element based on a respective plurality of assigned weights for the respective element; (ii) identifying one or more elements from the plurality of elements whose computed scores are below a predetermined threshold; and (iii) removing the identified one or more elements from the initial data visualization. The modified data visualization excludes the one or more identified elements.

In some implementations, the respective plurality of assigned weights for the respective element includes the respective semantic weight, a respective local density weight, and a respective overlap weight.

In some implementations, executing the one or more generalization operations includes executing a simplification operation, comprising: (i) determining a data shape of the initial data visualization; and (ii) removing data points from the initial data visualization while preserving the data shape of the initial data visualization.

In some implementations, the simplification operation preserves local extremum values of the initial data visualization, initial data points of the initial data visualization, and end data points of the initial data visualization.

In some implementations, executing the one or more generalization operations includes executing a merging operation that combines two or more of the plurality of elements.

In some implementations, a first element of the plurality of elements has a higher semantic importance than a second element of the plurality of elements. Displaying the modified data visualization includes displaying the first element more prominently than the second element.

In some implementations, the initial data visualization is a line chart.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus, methods, systems, and graphical user interfaces are disclosed that enable users to easily interact with line chart data visualizations at a wide variety of sizes, seeing the most semantically relevant elements at the displayed scale.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 4A-4F provide a flowchart of a method for resizing visualizations based on semantics that is performed at a computing device in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
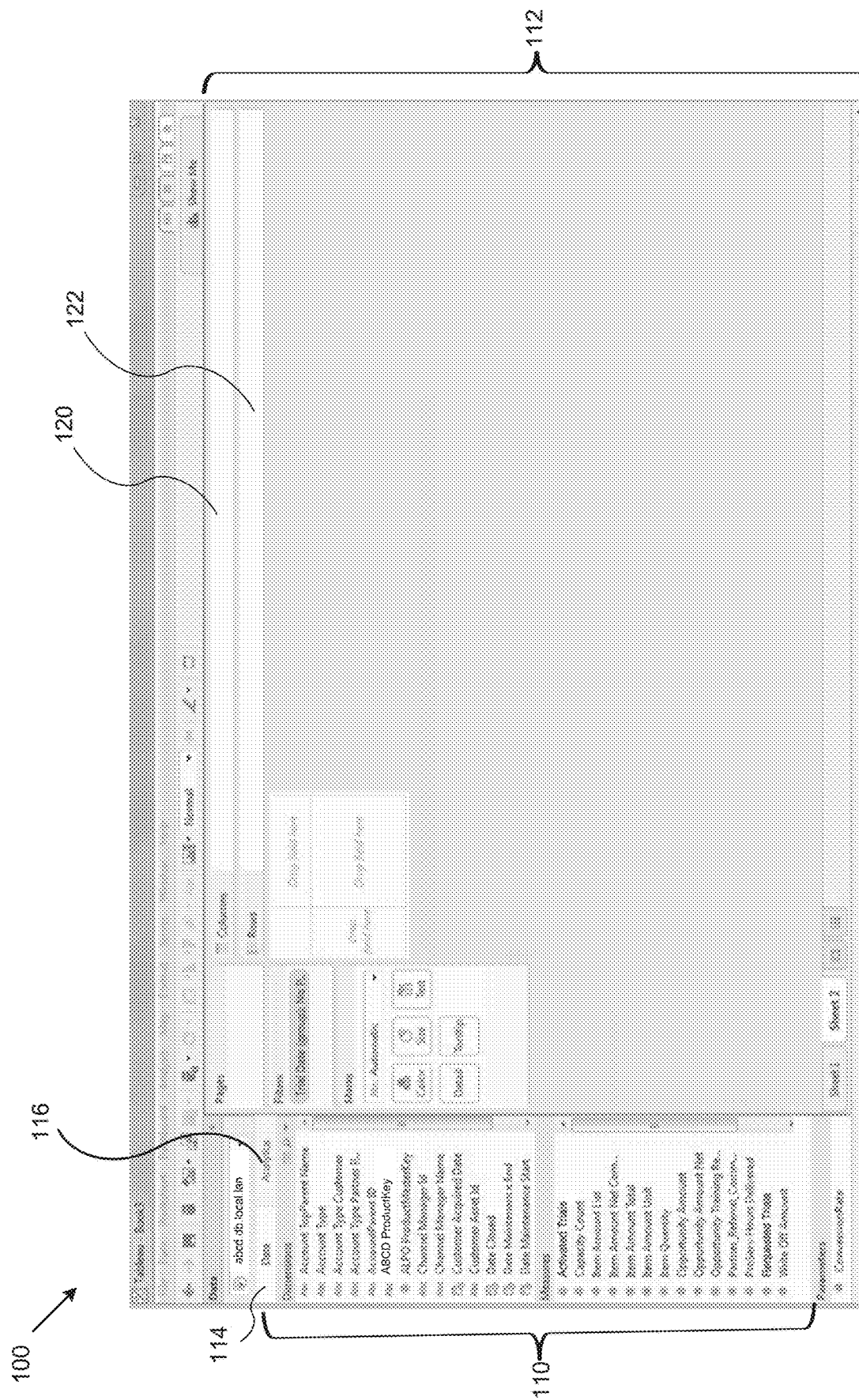
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
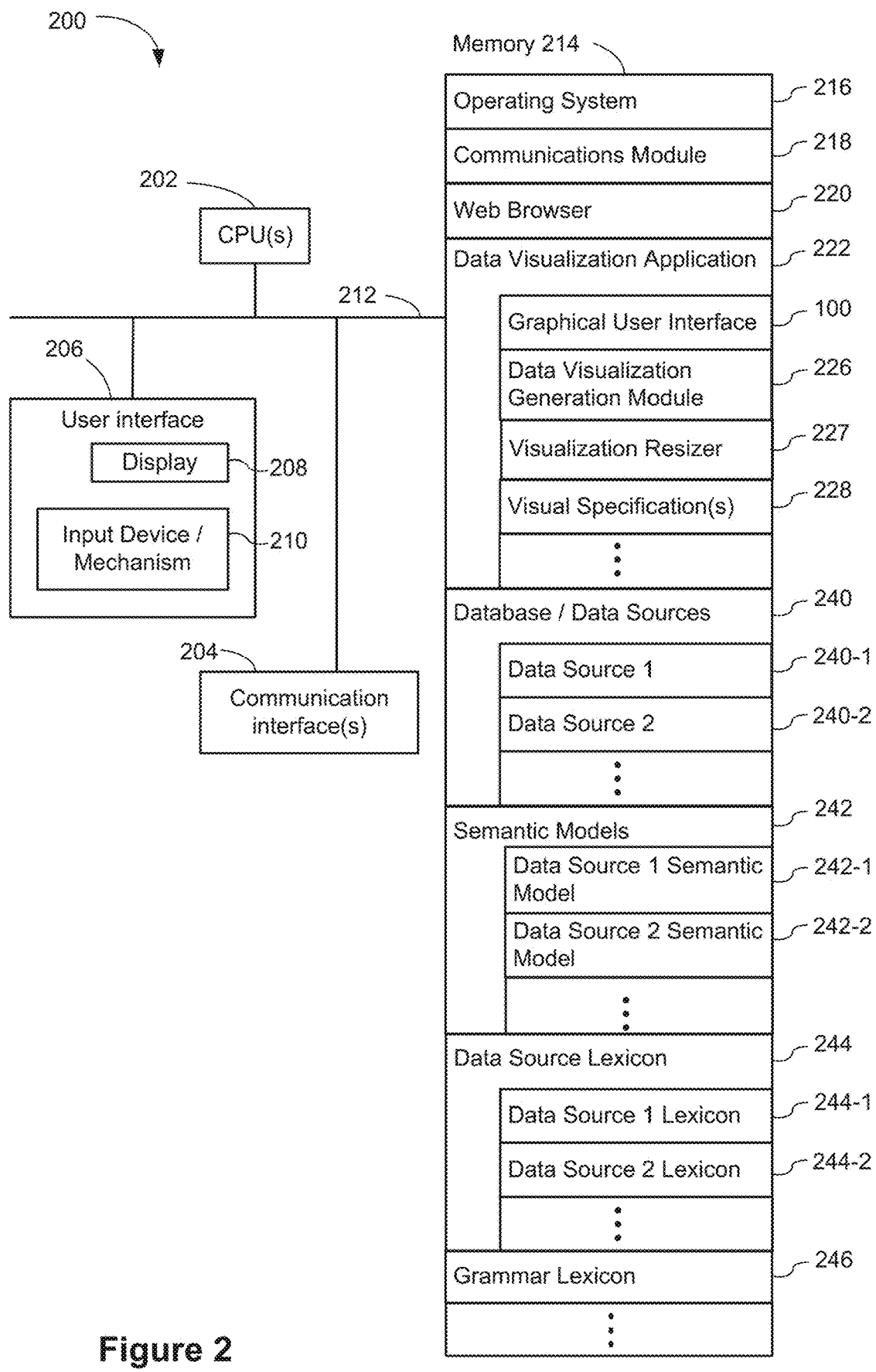
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) (e.g., processors) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 (or a dashboard) for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;
- visual specifications 228, which store the information a user provides (e.g., user input). A visual specification 228 specifies the data source 240 (e.g., the user selected data source), a plurality of visual variables, and a plurality of data fields from the data source. Each of the data fields is identified as either a dimension or a measure. At least some of the visual variables are associated with a respective one or more of the data fields. Each of the visual variables defines a respective characteristic of data marks in the data visualization according to association of a respective one or more of the data fields with the respective visual variable, the respective characteristic specifying horizontal position, vertical position, color, size, or text, for the data marks. In some implementations, the visual specifications 228 include previous natural language commands received from a user or properties specified by the user through natural language commands;
- zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database;
- zero or more semantic models 242 (e.g., a first semantic model 242-1 and a second semantic model 242-2), each of which is derived directly from a respective database or data source 240. A semantic model 242 represents a database schema and contains metadata about attributes (e.g., data fields). In some implementations, a semantic model 242 also includes metadata of alternative labels or synonyms of the attributes. A semantic model 242 includes data types (e.g., "text," "date," "geospatial," "Boolean," and "numeric"), attributes (e.g., a currency type such as the United States Dollar), and a semantic role (e.g., the "City" role for a geospatial attribute) for data fields of the respective database or data source 240. In some implementations, a semantic model 242 also captures statistical values (e.g., data distributions, range limits, average, and cardinality) for each attribute. In some implementations, a semantic model 242 is augmented with a grammar lexicon 246, which contains a set of analytical concepts found in many query languages (e.g., average, filter, and sort). Details of analytical concepts are described in U.S. patent application Ser. No. 16/234,470, filed on Dec. 27, 2018, entitled "Analyzing Underspecified Natural Language Utterances in a Data Visualization User Interface," which is incorporated by reference herein in its entirety. In some implementations, a semantic model 242 also distinguishes between attributes that are measures (e.g., attributes that can be measured, aggregated, or used for mathematical operations) and dimensions (e.g., fields that cannot be aggregated except by counting). Thus, a semantic model 242 helps with inferencing and choosing salient attributes and values;

zero or more data source lexicons 244 (e.g., a first data source lexicon 244-1 and a second data source lexicon 244-2), each of which is associated with a respective database or data source 240. Details of the components of a data source lexicon are described in in U.S. patent application Ser. No. 16/234,470, filed on Dec. 27, 2018, entitled "Analyzing Underspecified Natural Language Utterances in a Data Visualization User Interface," which is incorporated by reference herein in its entirety; and a grammar lexicon 246, which includes analytical concepts that are used to support the analytical expressions (e.g., for forming intermediate expressions based on natural language inputs that are received by the data visualization application).

In some implementations, the data visualization application 222 includes a visualization resizer 227, which resizes visualizations at different target display sizes (e.g., using a cartographic generalization algorithm). The visualization resizer 227 identifies and categorizes chart elements in a generated data visualization, and adaptively performs a set of generalizations that select and abstract the elements based on a set of spatial and semantic constraints. The constraints determine the type of generalization operations that are applied to the resized data visualization (e.g., line chart) to minimize visual clutter. In some implementations, the visualization resizer 227 is implemented using HTML5/JavaScript and D3.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
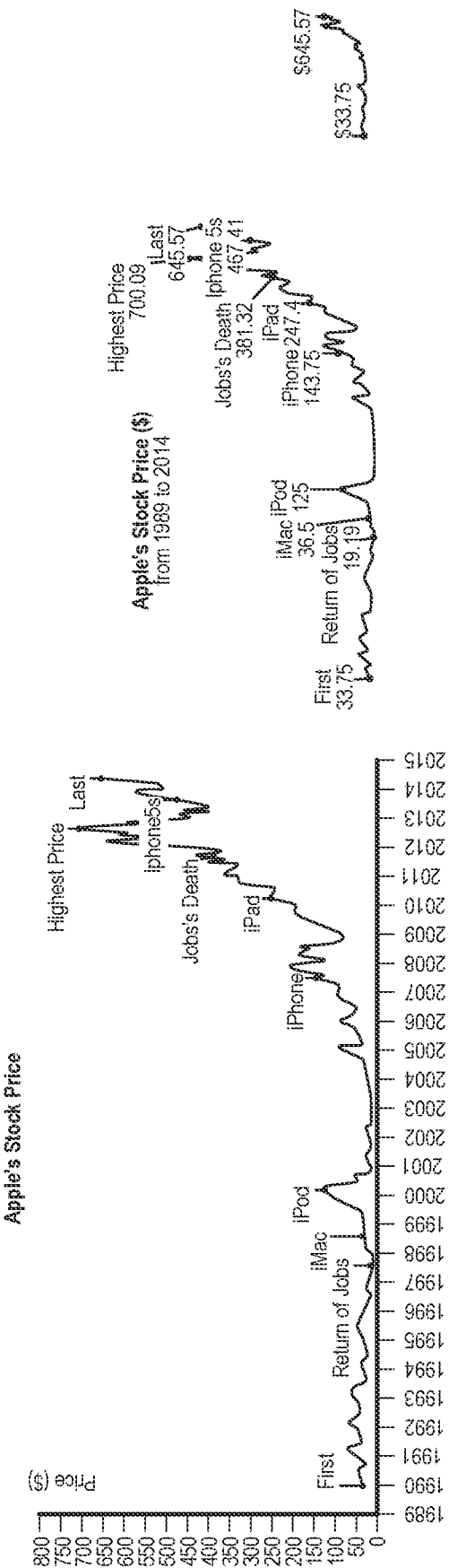
FIGS. 3A-3V illustrate the disclosed algorithms for displaying an appropriate amount of semantically relevant information, regardless of display size, reducing the amount of visual clutter.
Figure 3B:
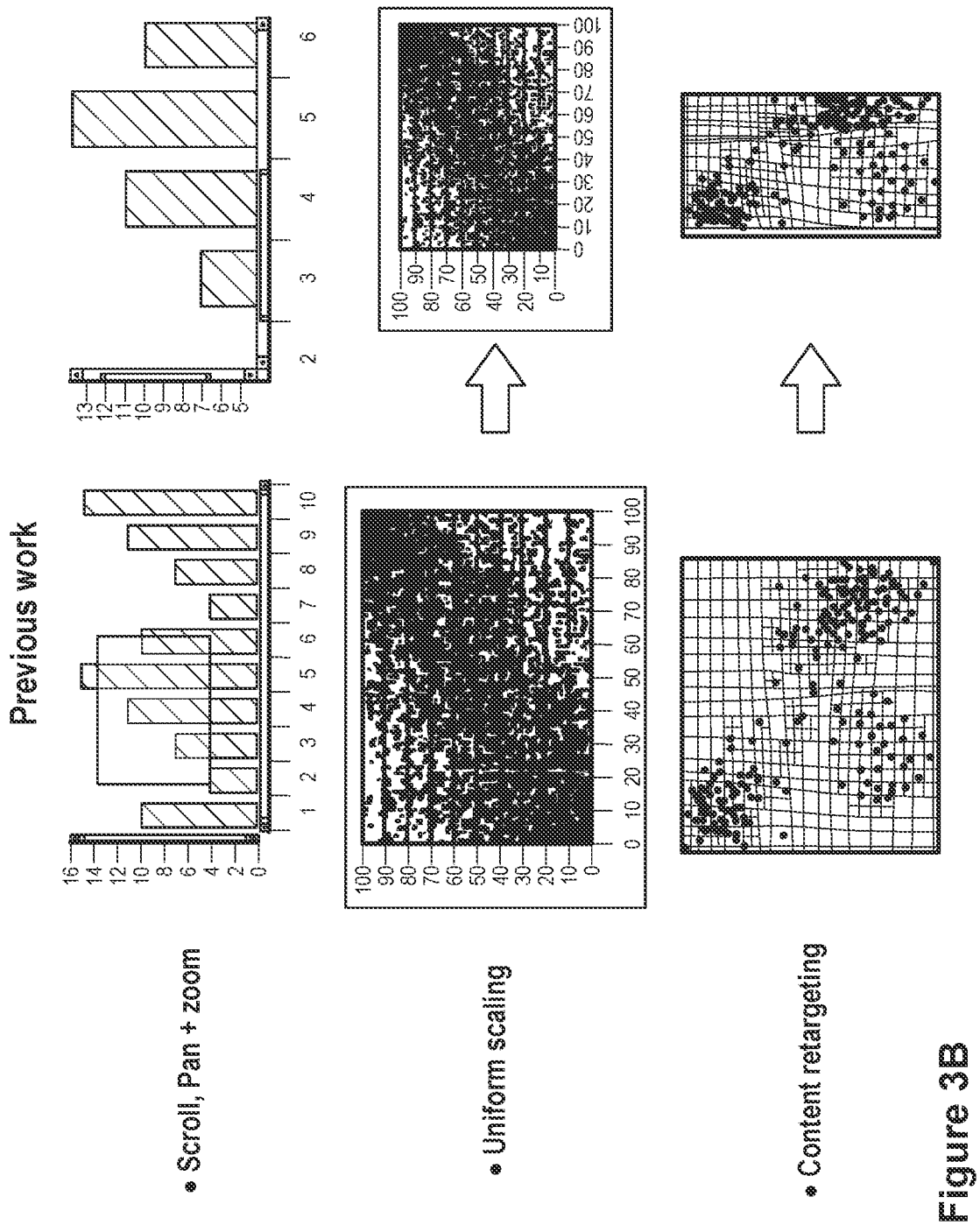
Figure 3C:
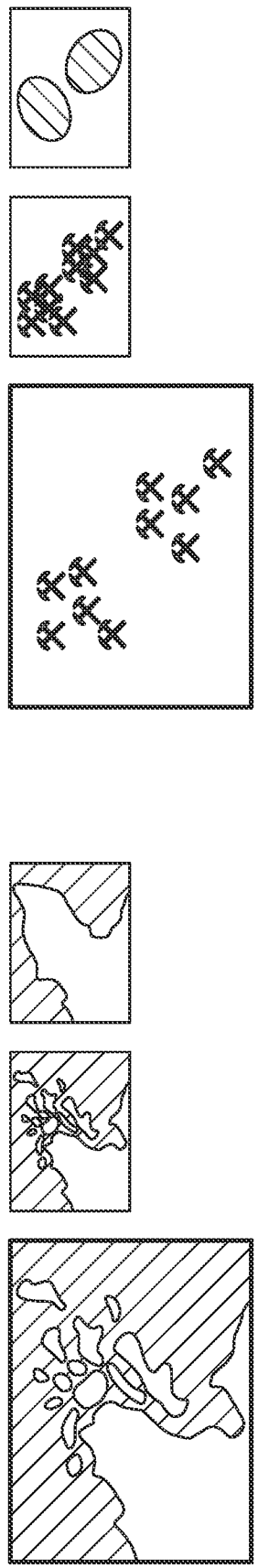
Figure 3D:
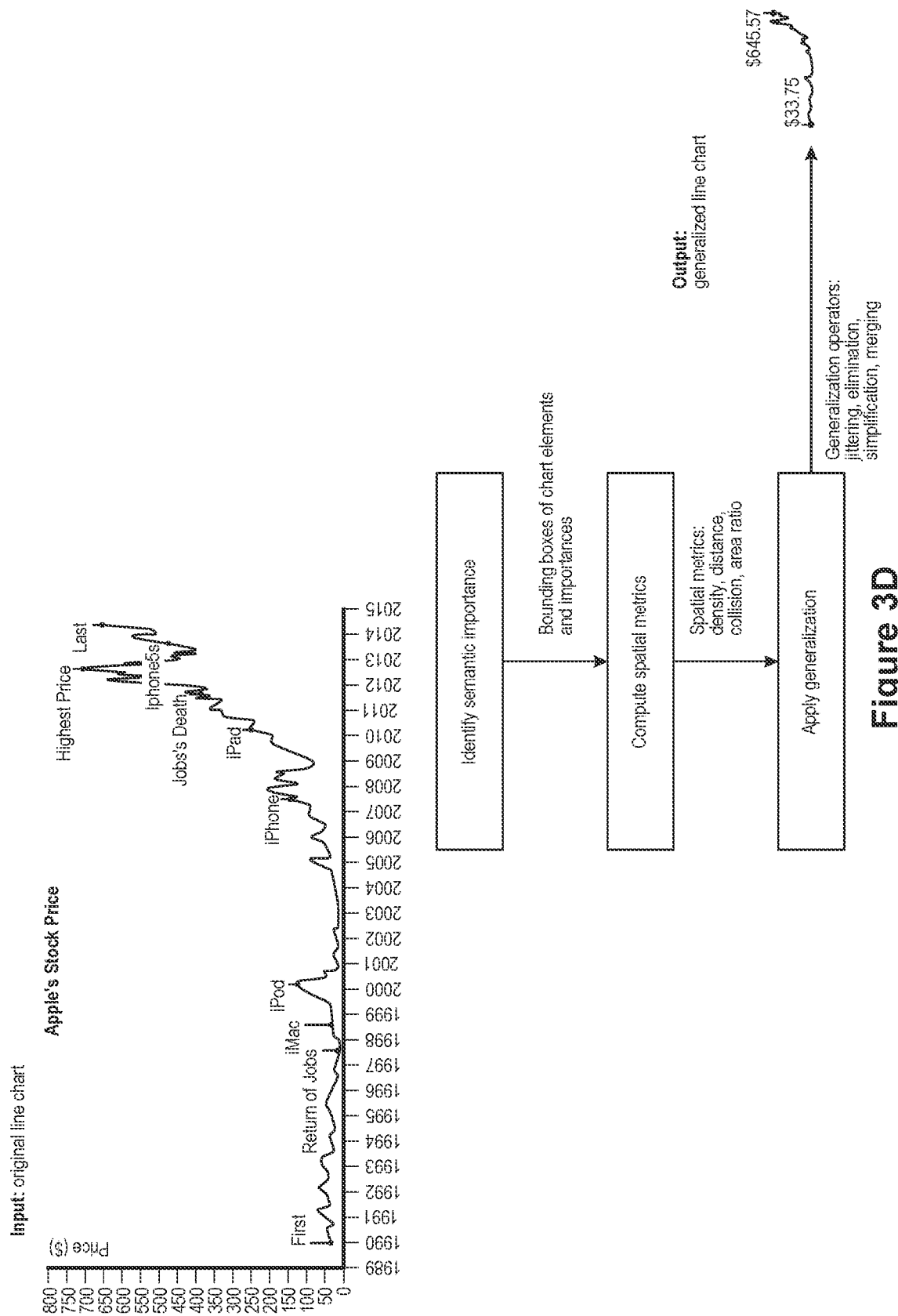
Figure 3E:
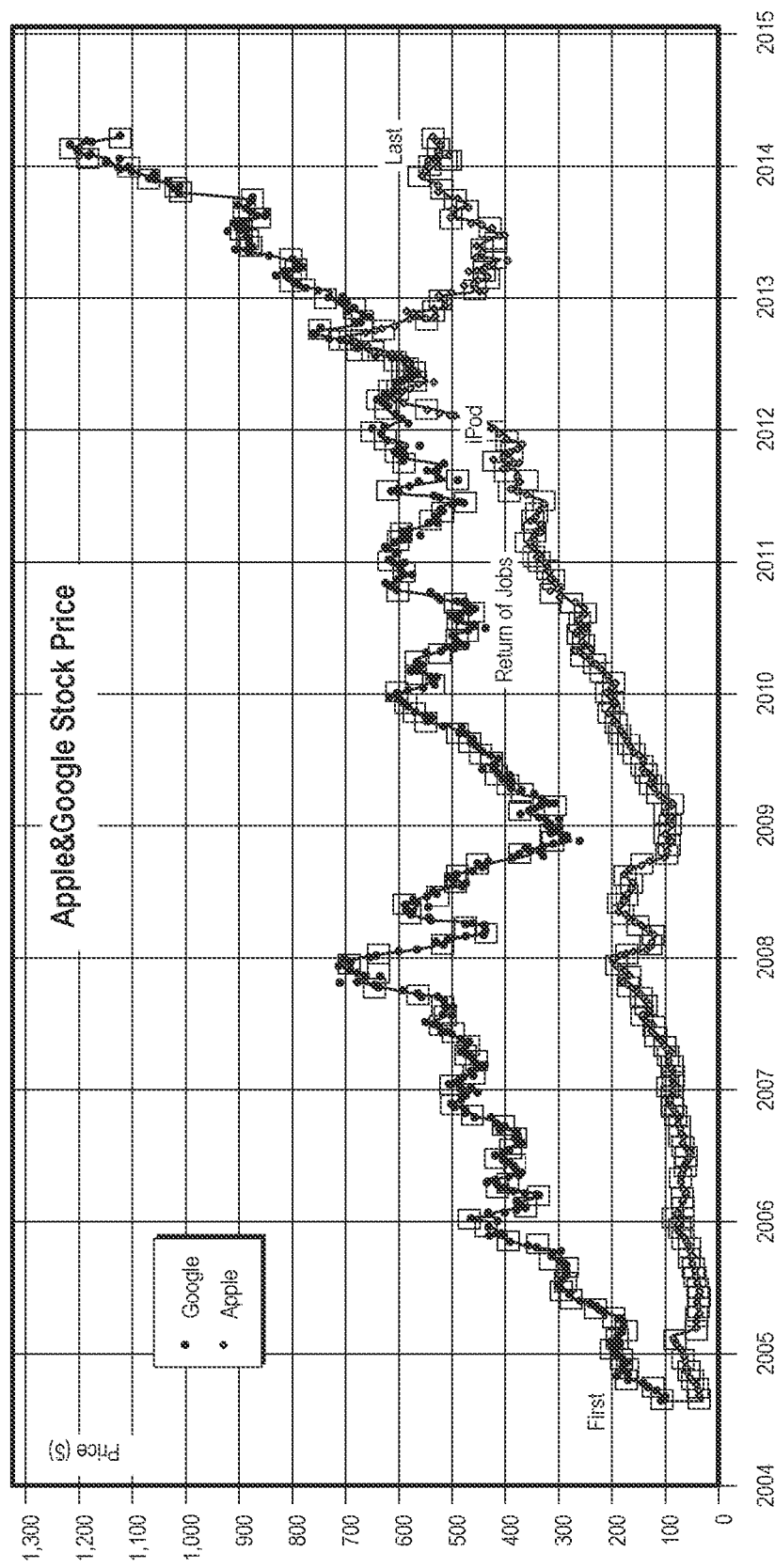
Figure 3F:
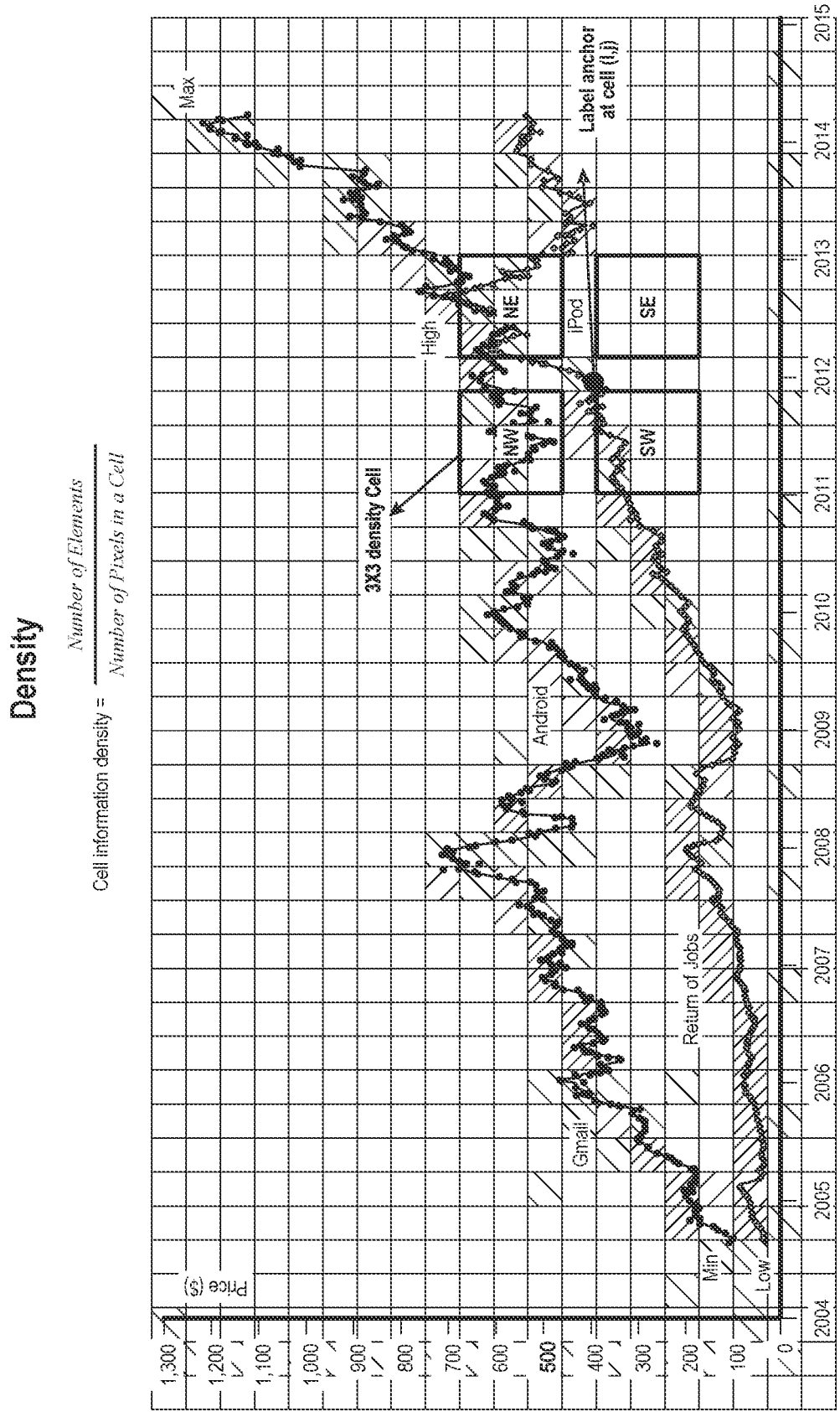
Figure 3G:
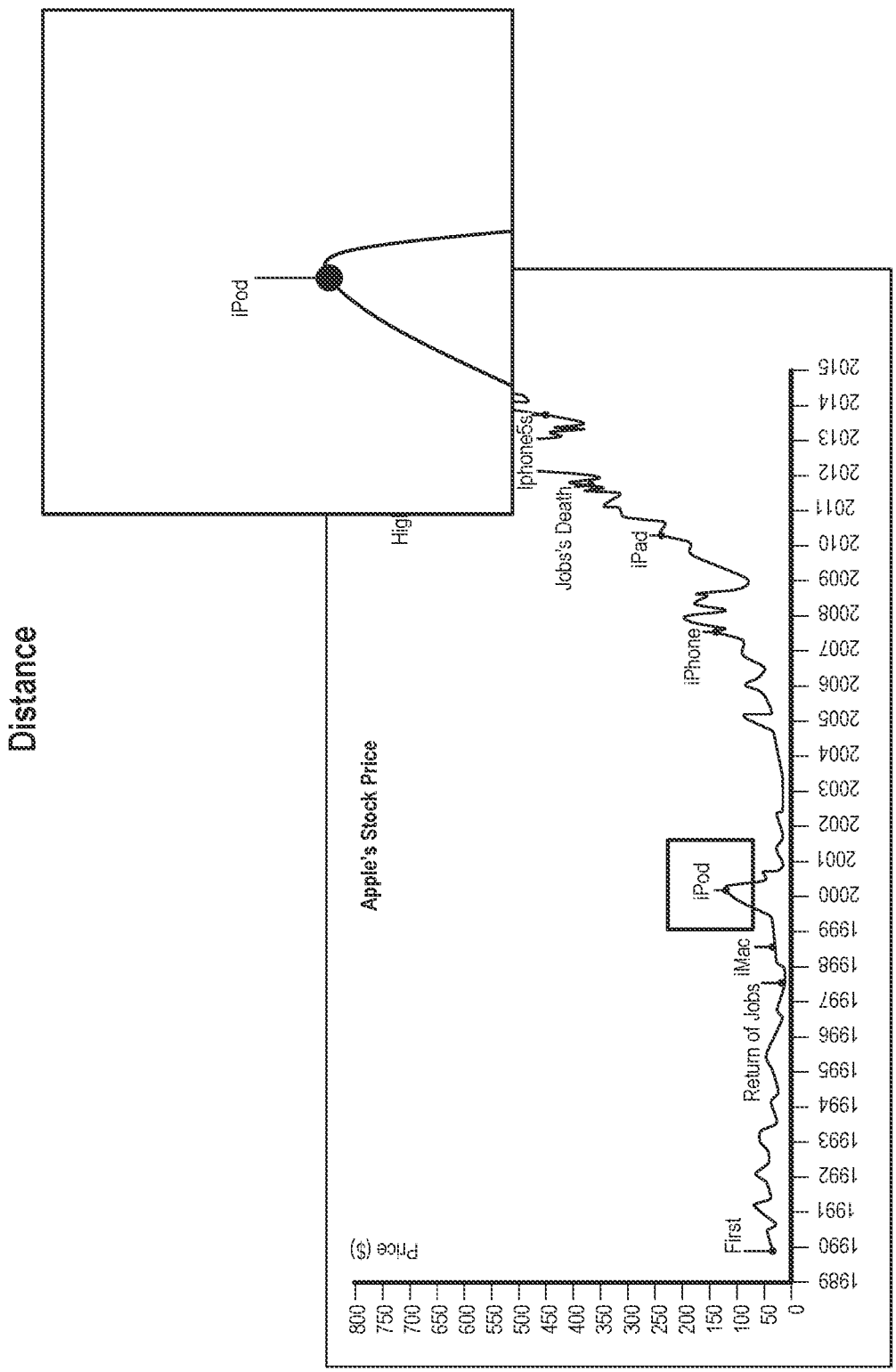
Figure 3H:
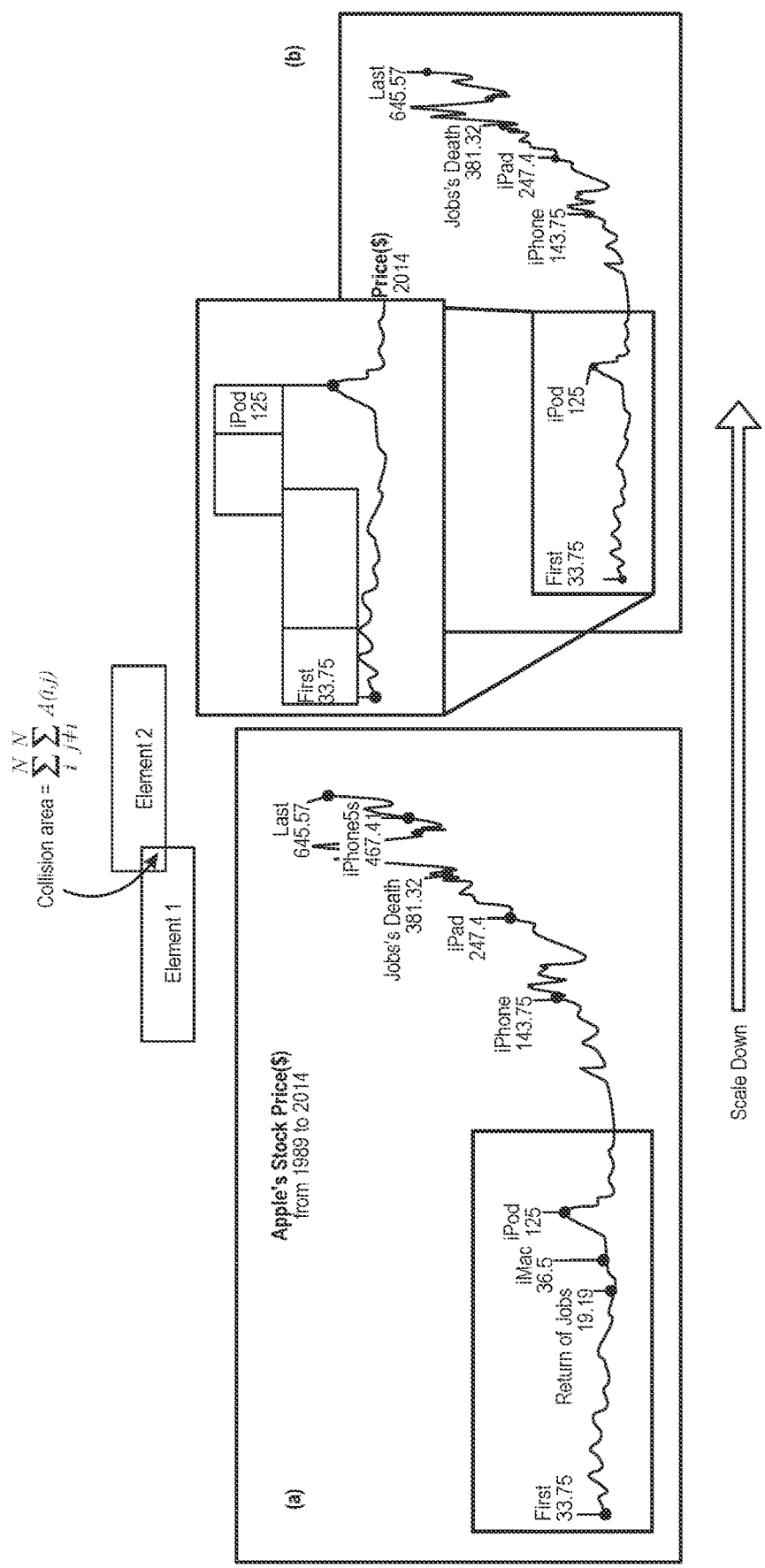
Figure 3I:
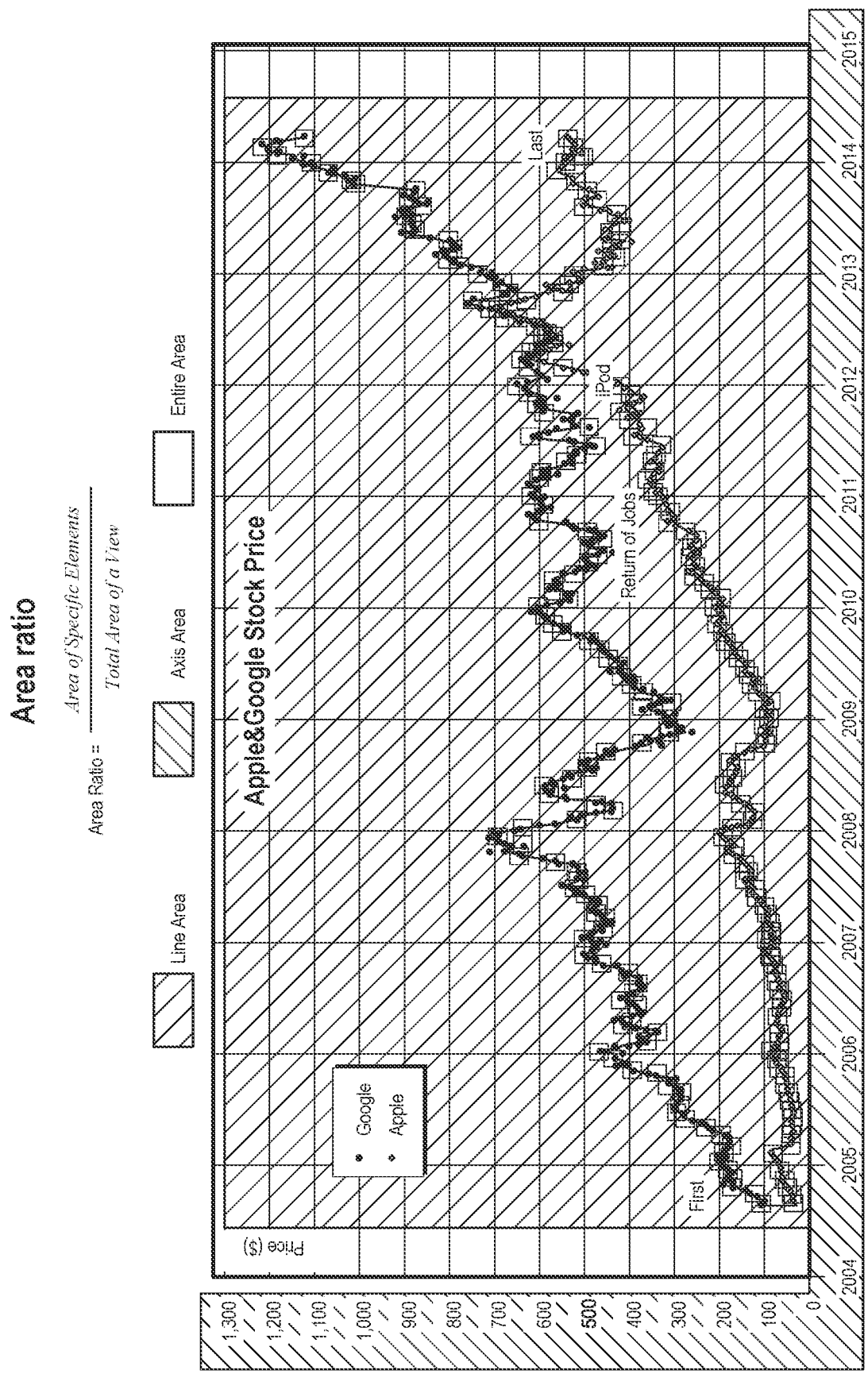
Figure 3J:
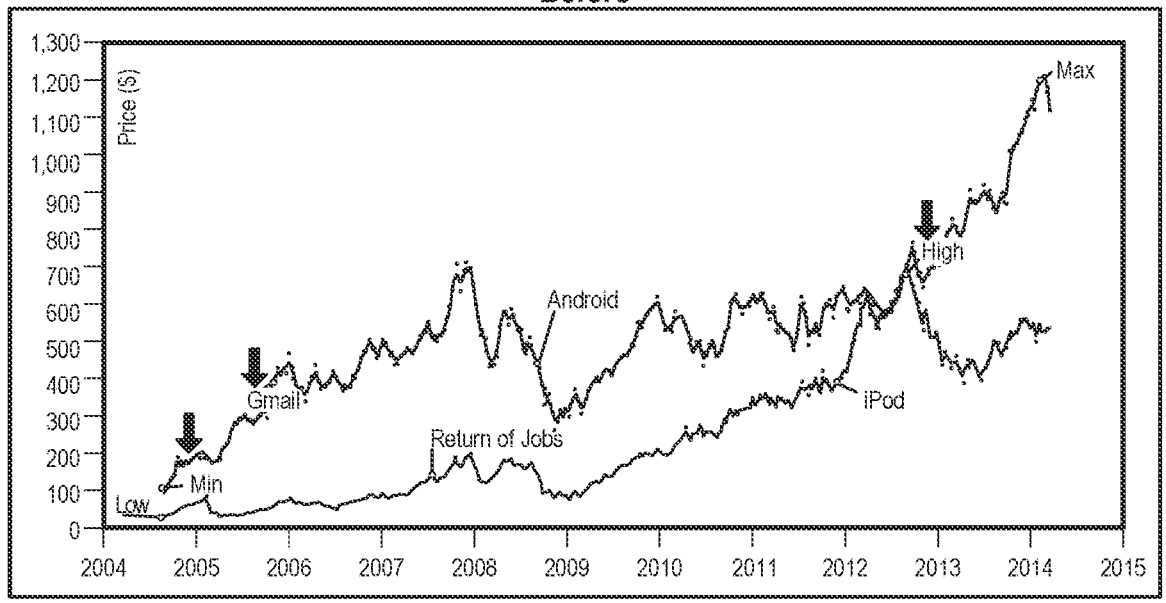
Figure 3J:
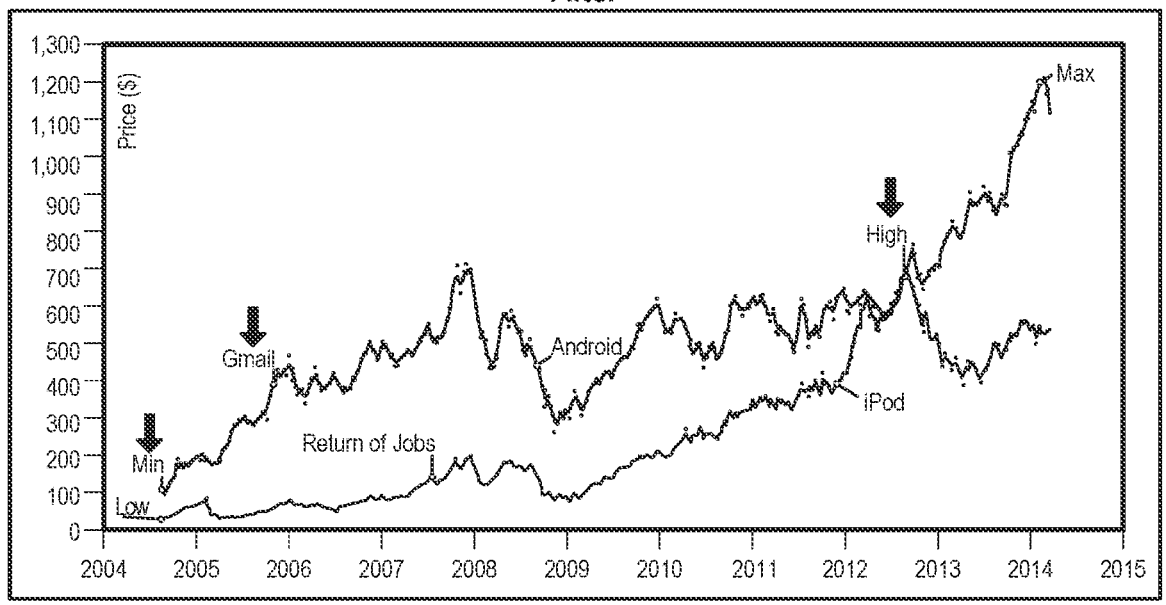
Figure 3K:
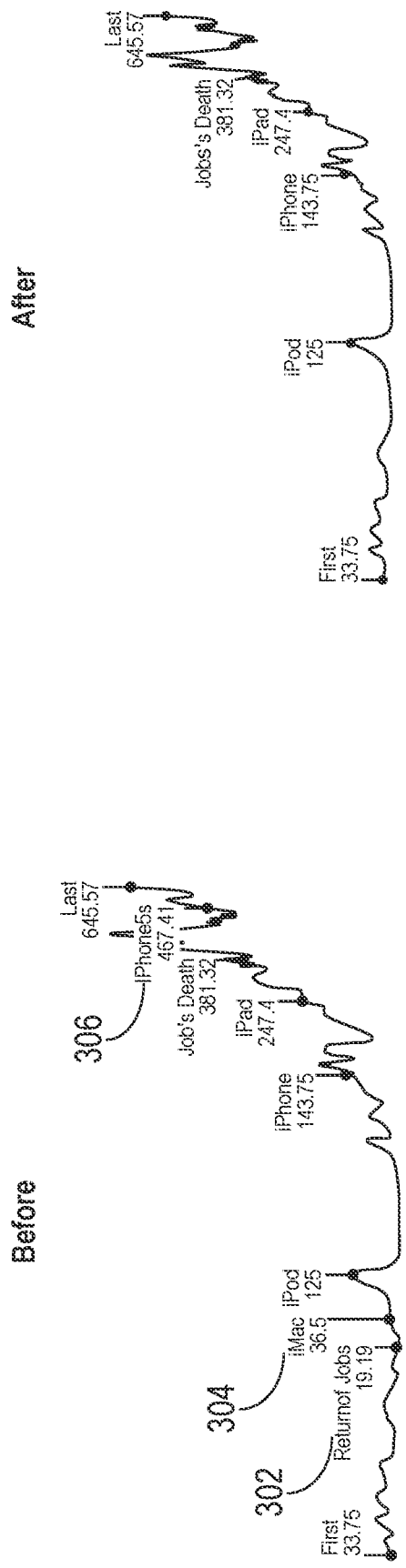
Figure 3M:
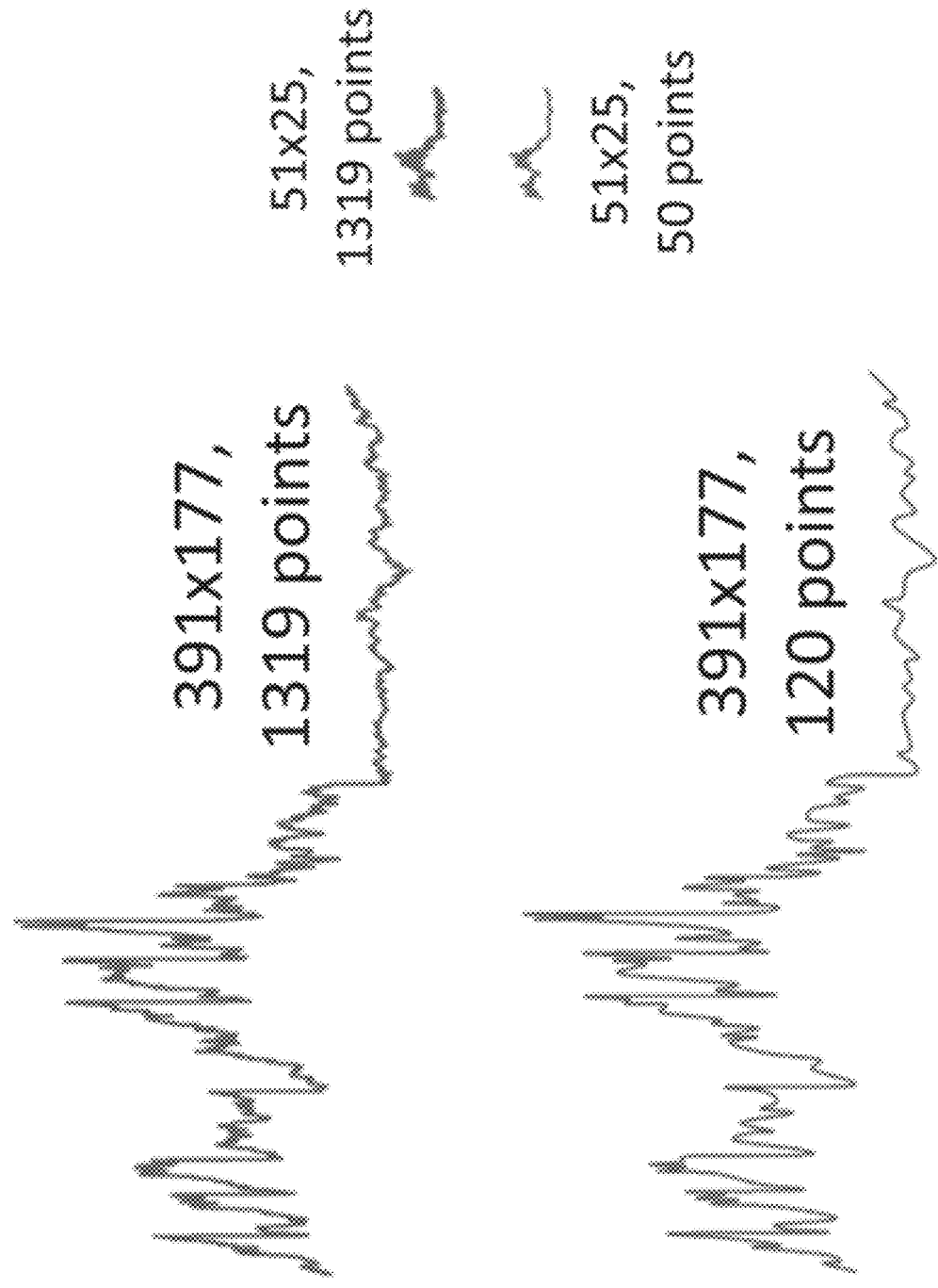
Figure 3N:
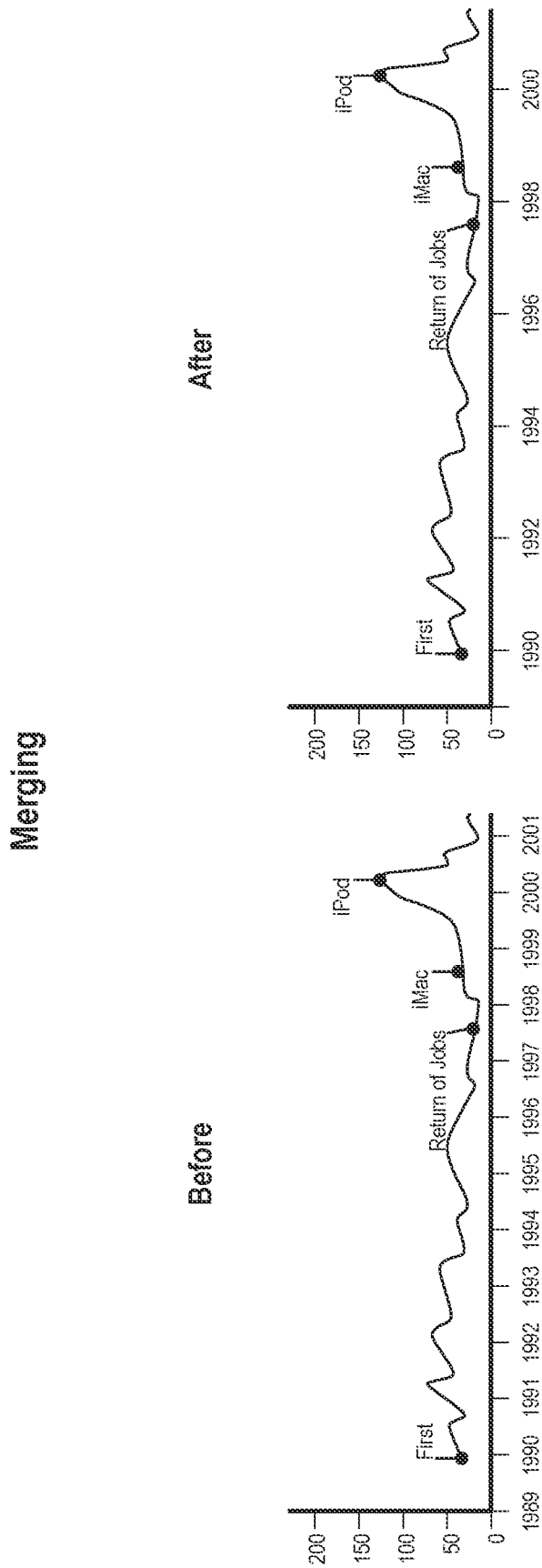
Figure 3O:
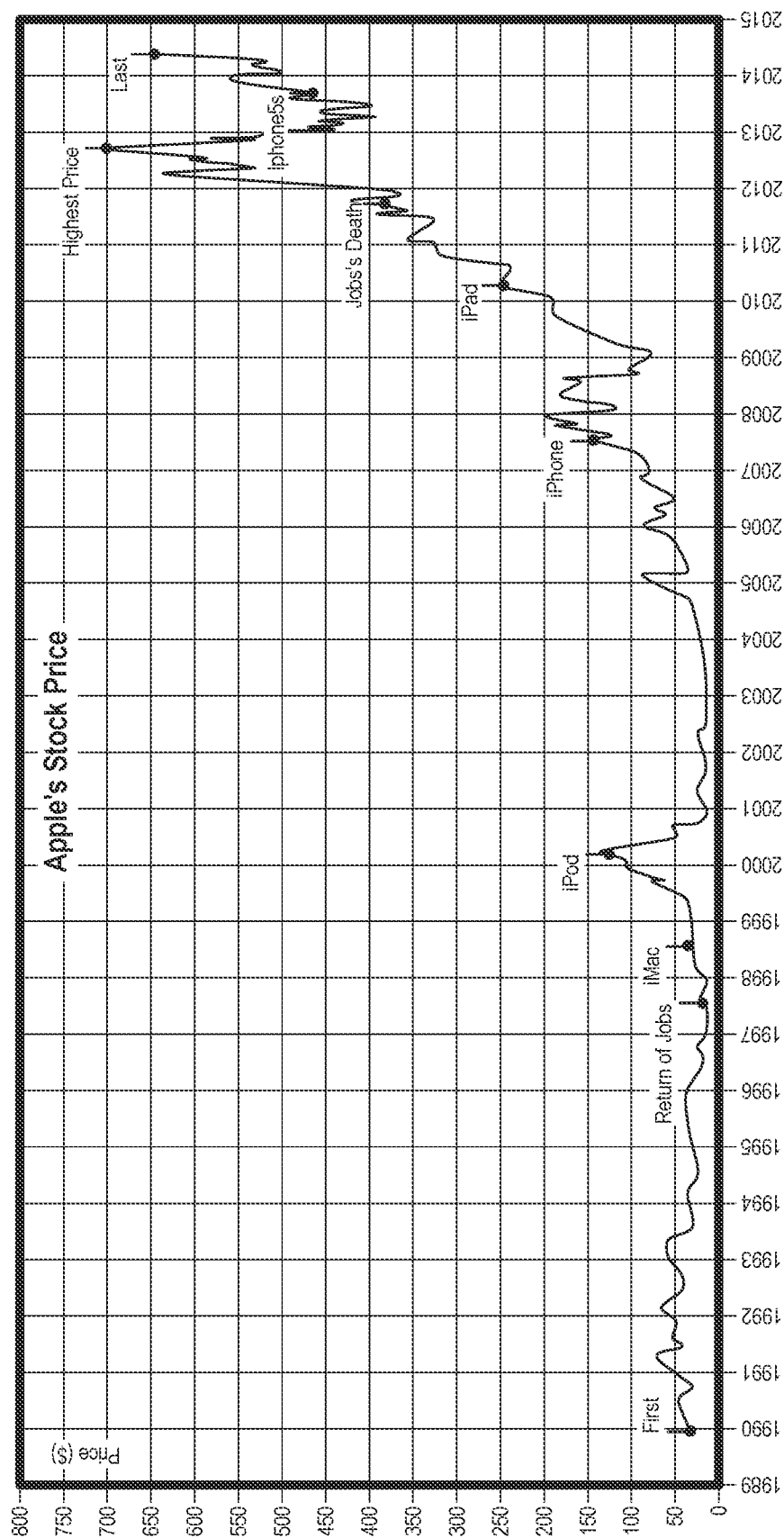
Figure 3P:
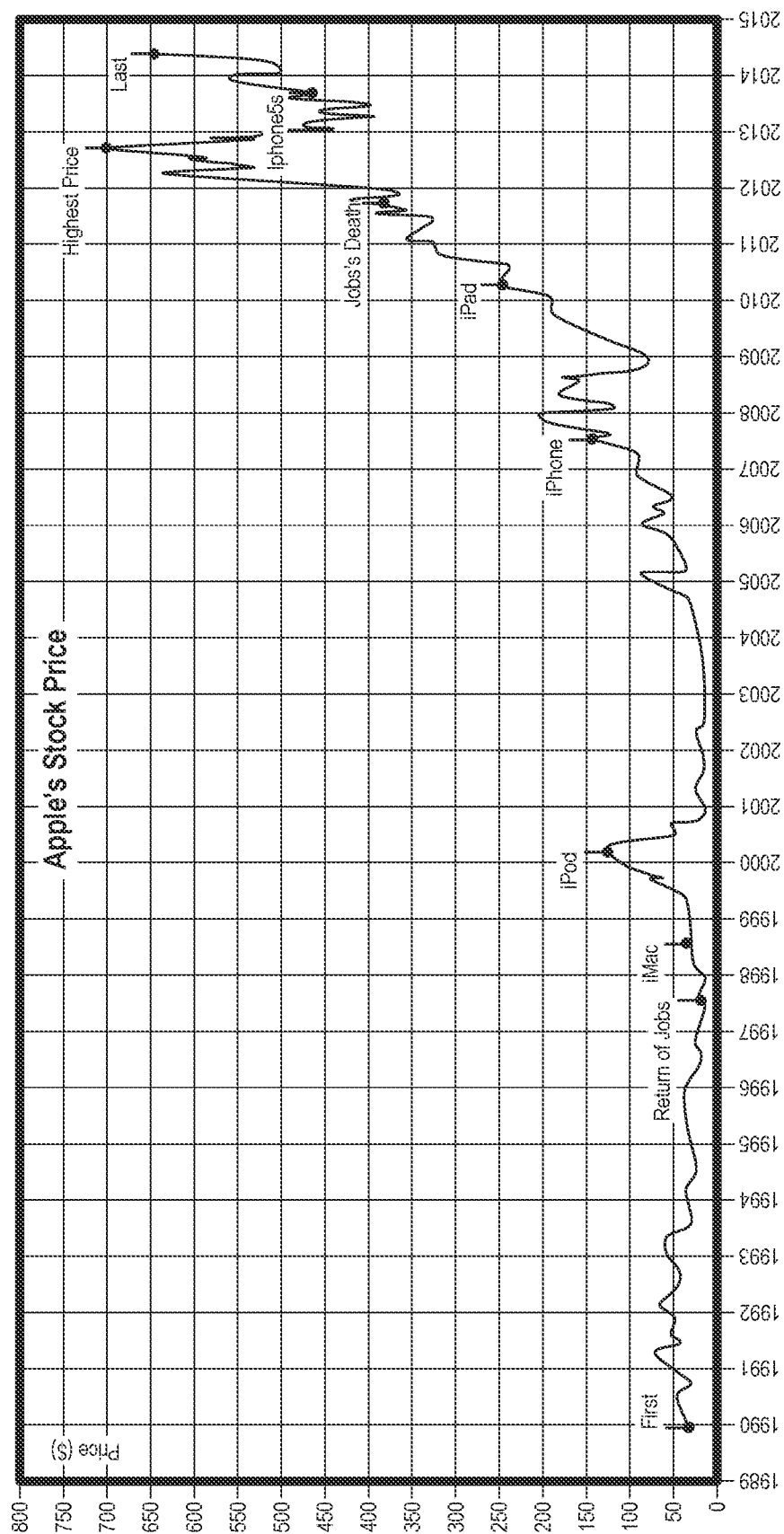
Figure 3Q:
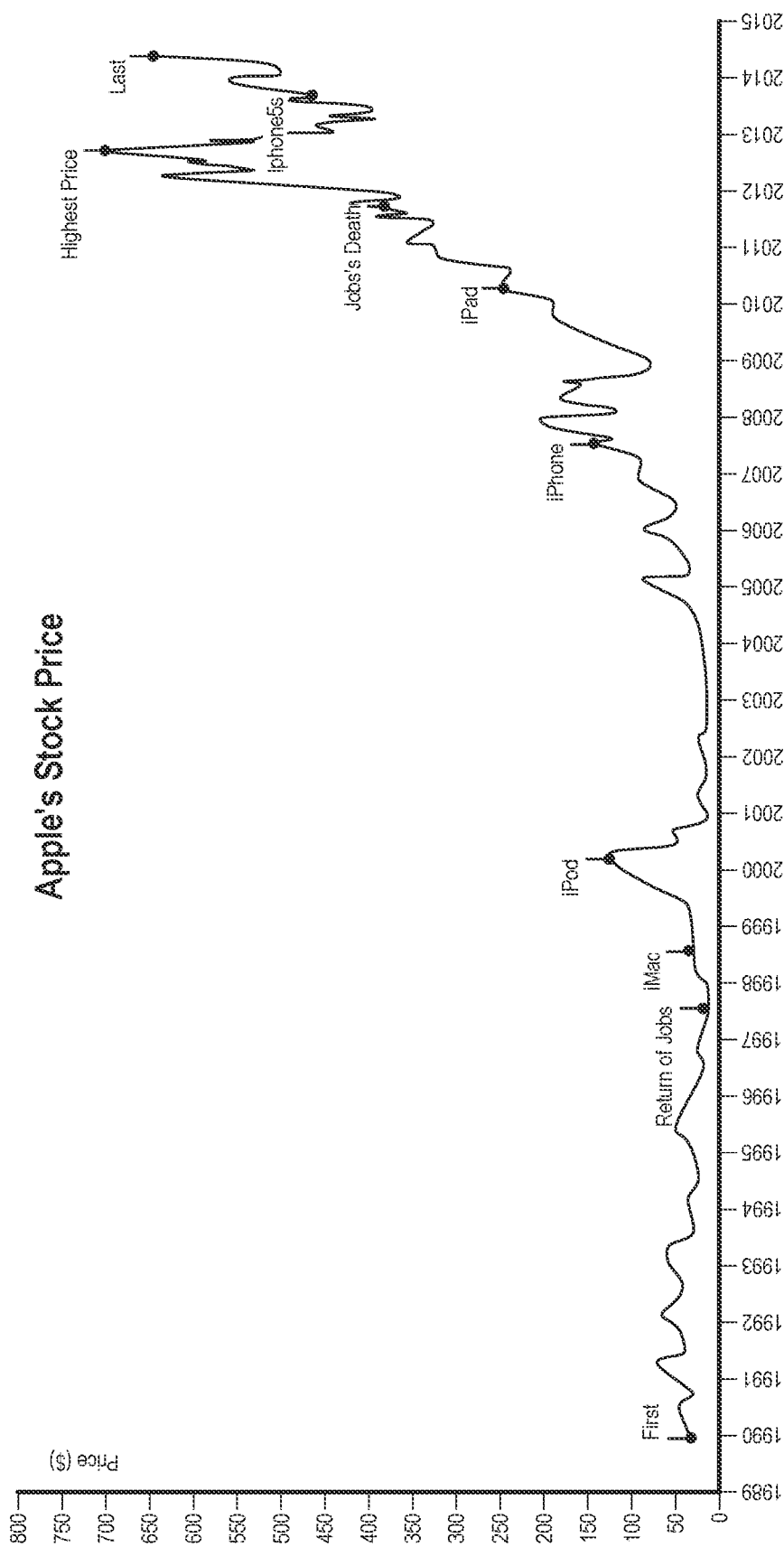
Figure 3R:
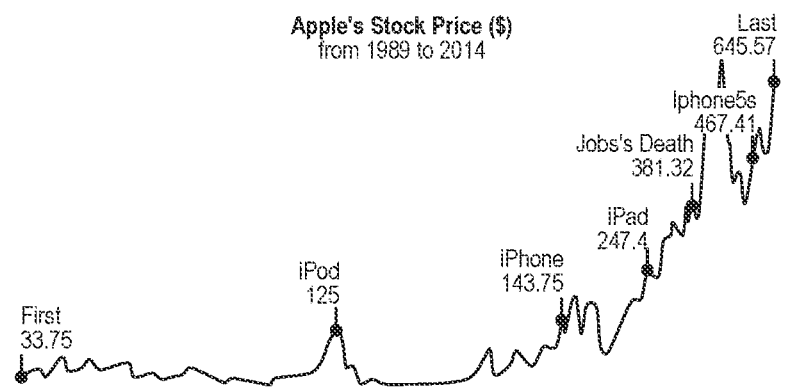
Figure 3S:
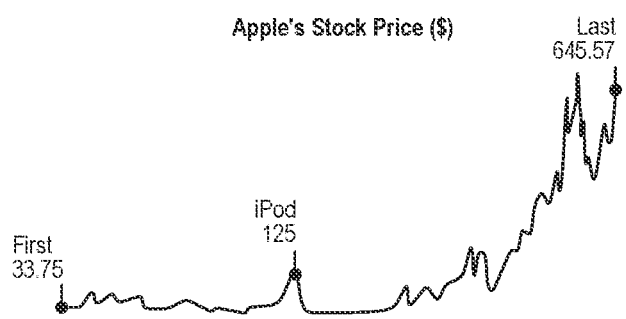
Figure 3T:
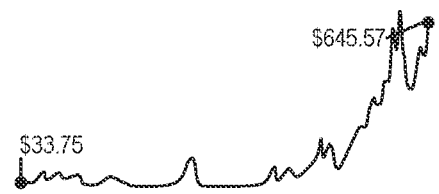
Figure 3U:
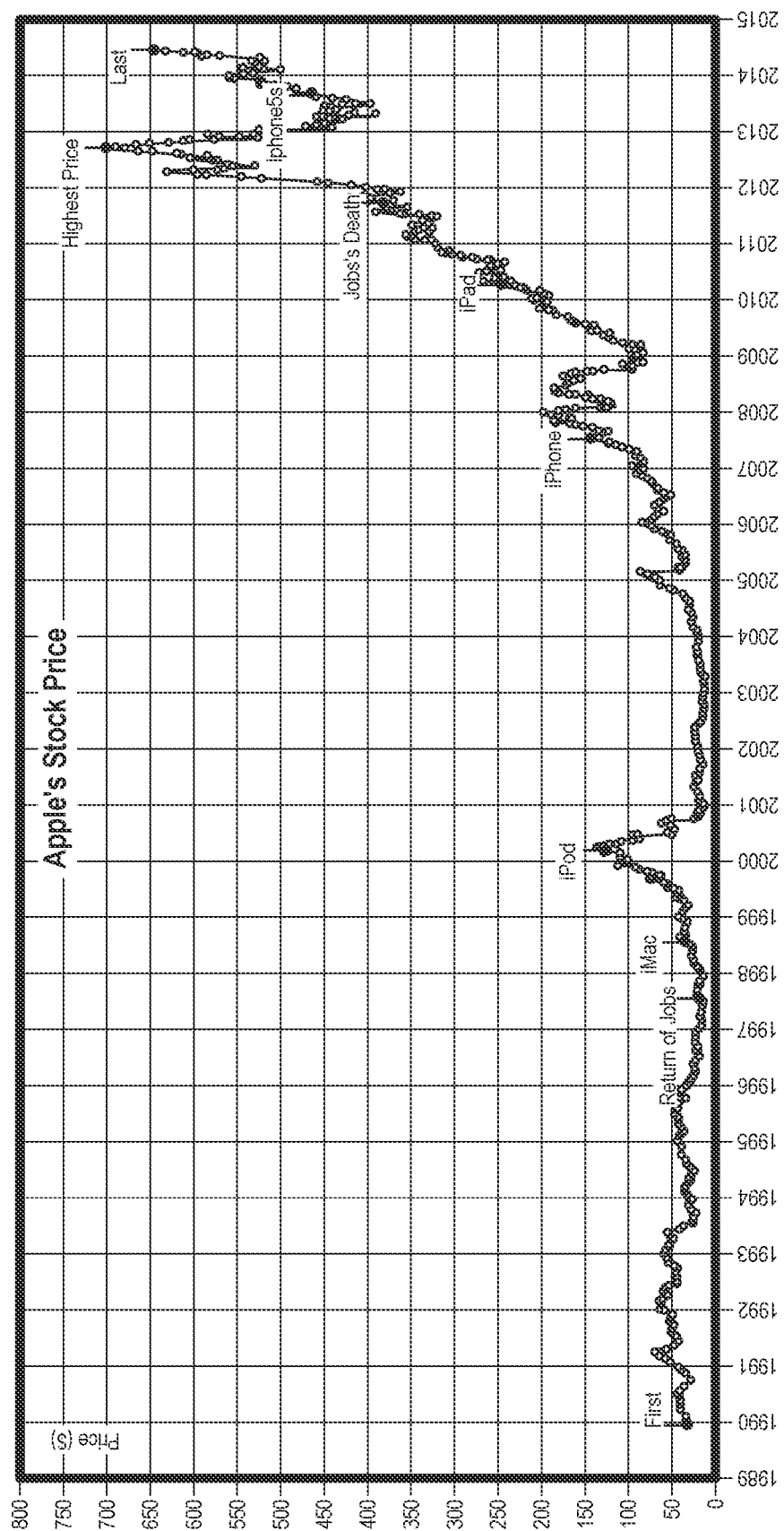
Figure 3V:
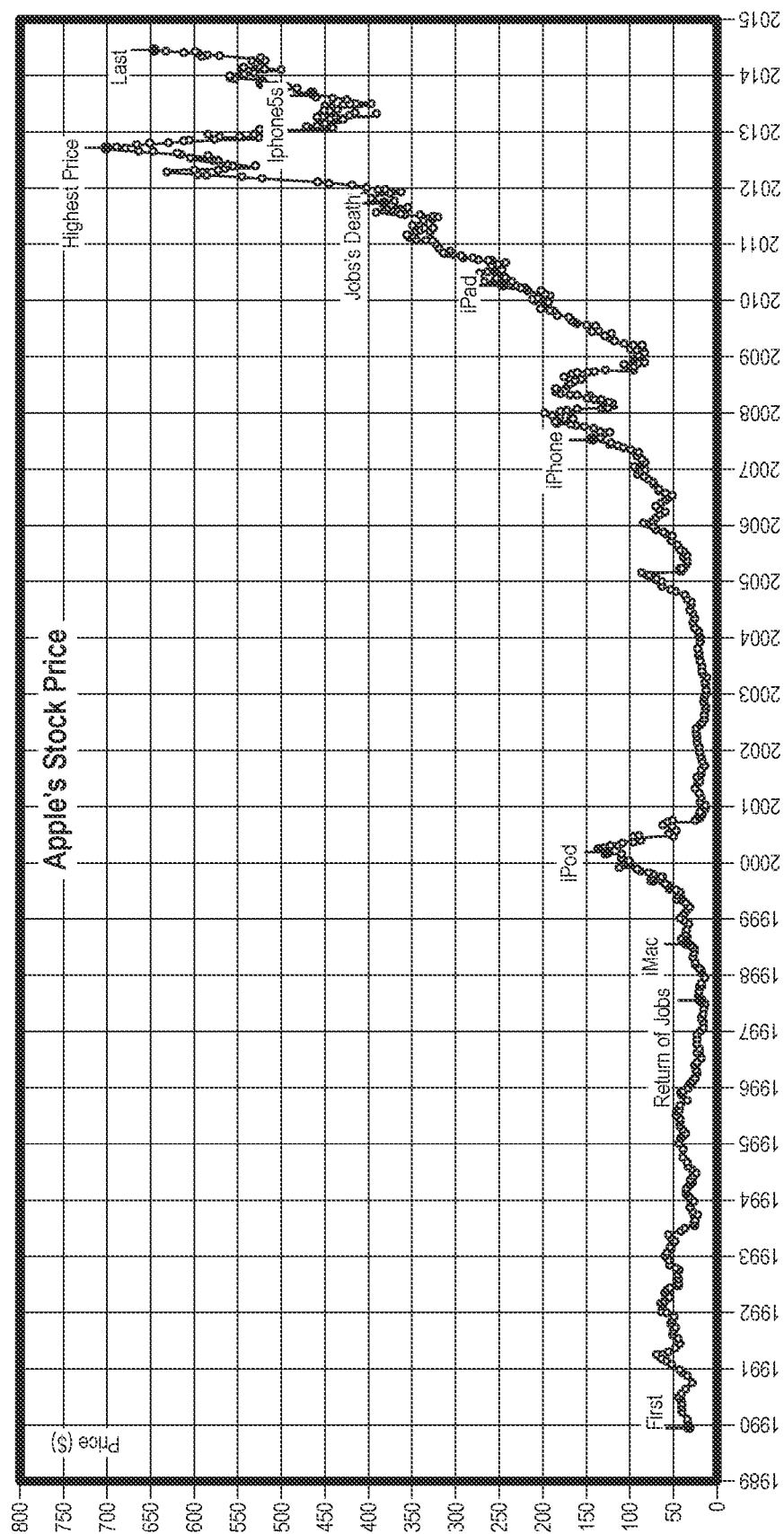
Figure 4A:
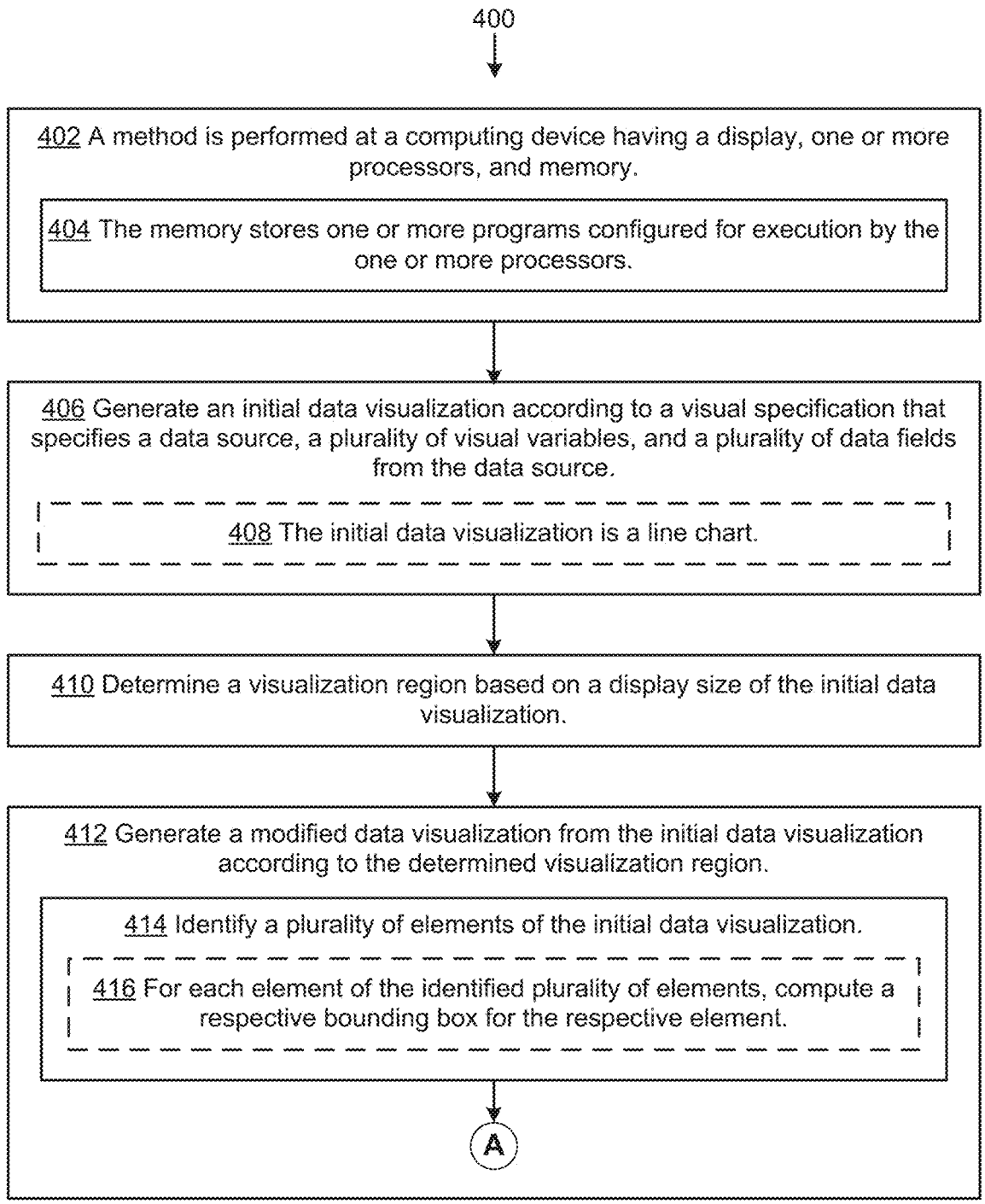
Figure 4D:
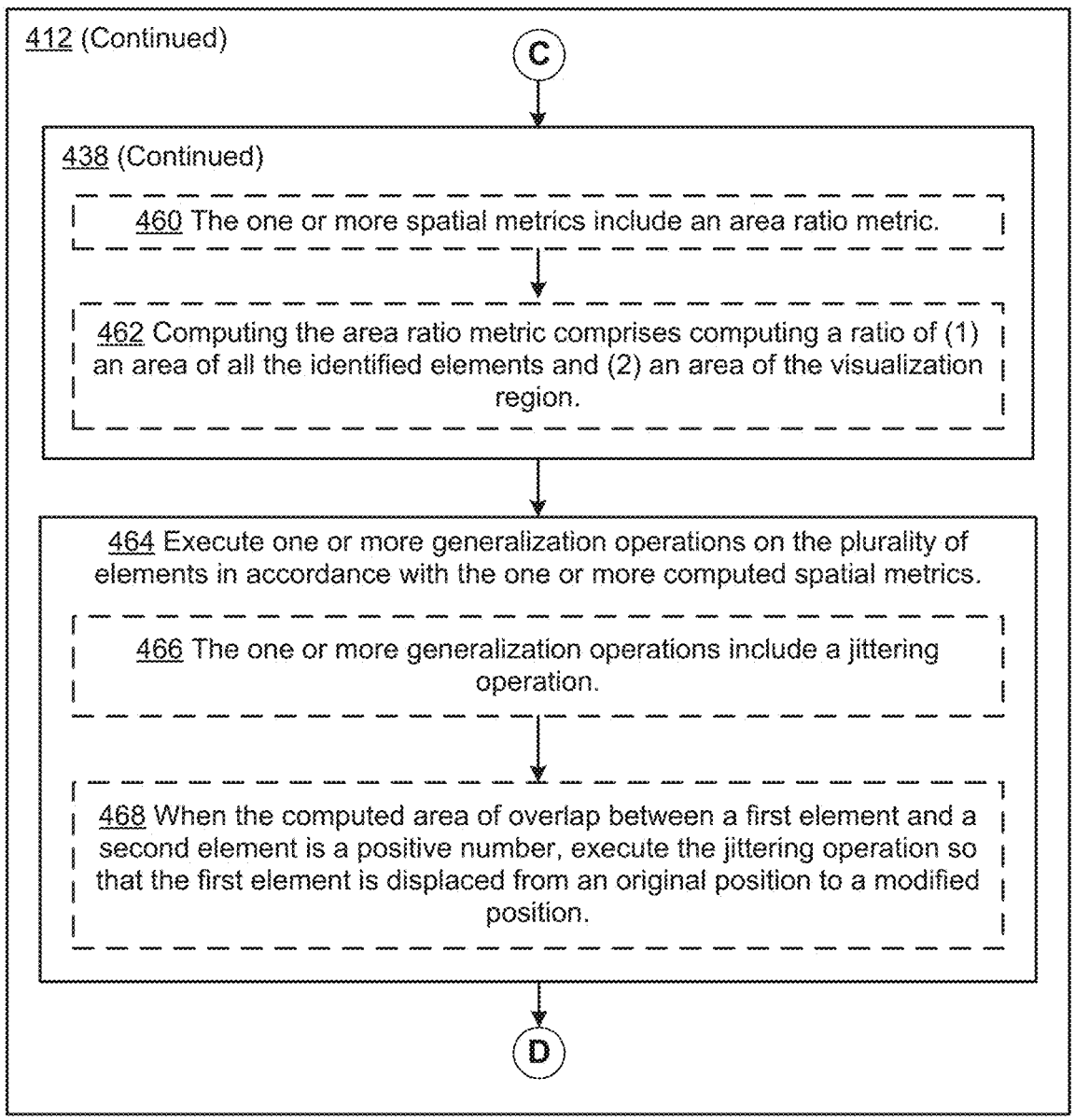
Figure 4F:
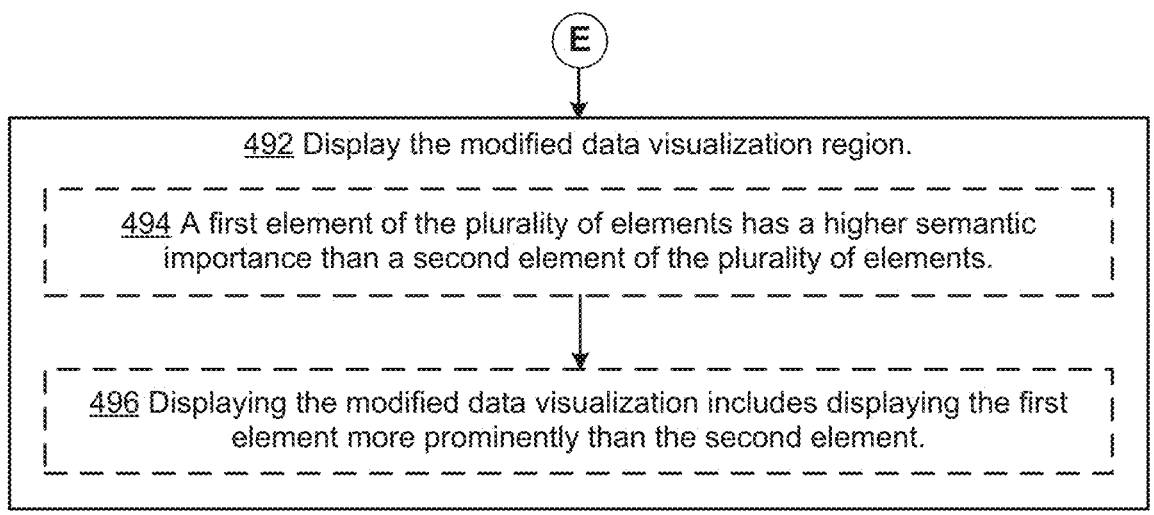

FIGS. 3A-3V illustrate steps used in some implementations. These figures illustrate how cartographic generalization can be applied to line charts, as shown in FIG. 3A. This can apply to various target display sizes.

FIG. 3B illustrates various previous techniques that have been used to show content. They do not focus on the special and semantic properties of chart elements when generalizing to different sizes.

An important question is how to automatically preserve the recognizability of semantically important elements of the chart at different target display sizes. This entails emphasizing semantically important elements and deemphasizing less important elements.

FIG. 3C illustrates the principle of cartographic generalization.

FIG. 3D illustrates applying the principle of cartographic generalization in the context of line charts. The process includes three steps: (1) identifying semantic importance of each element; (2) computing spatial metrics; and (3) applying the generalization.

Identifying Semantic Importance

In some implementations, the computing device 200 (e.g., executing a cartographic generalization process) assigns higher semantic weights to local extrema, first data values, and last data values, compared to chart elements such as axes or tick marks.

In some implementations, the computing device 200 assigns each element a unique ID.

In some implementations, a bounding box is computed for each of the elements.

In some implementations, the computing device 200 categorizes similar elements (e.g., elements having the same or similar semantic weights) into layers, and applies different constraints and generalization operators based upon the unique characteristics and semantics of each element layer.

FIG. 3E illustrates identifying semantic importance. In some implementations, the computing device 200 identifies all of the individual elements, such as labels, data marks, axes, and tick marks, then computes their bounding boxes. The computing device 200 then assigns an importance weight ranging from 0.0 (not at all important) to 1.0 (very important). Highly important elements include extrema, start points, and end points.

Computing Spatial Metrics

According to some implementations of the present disclosure, various spatial metrics are computed (e.g., by a computing device 200) for the elements in the resized data visualization (e.g., a line chart) to minimize visual clutter. The spatial metrics include density, distance, collision, and area ratio.

Disclosed implementations use the following guidelines:

Avoid congestion: A visualization view should not include too many elements at a specific region.

Avoid conflict: To maintain legibility, elements should not overlap. Each element should be easily identifiable and readable.

Make more semantically important elements prominent: An element of higher importance value should be more visible than less important ones.

FIG. 3F illustrates computing density for a multivariate data visualization (e.g.., a line chart view). The entire data visualization is divided into m×n uniform cells, with n and m determined (e.g., empirically) by the target display size. The darker the square, the higher the density. The density surrounding a point determines whether a label should be jittered.

In some implementations, the computing device 200 applies Topfer's Radical Law to express the number of elements that can be maintained at that size:

$$\text{Cell information Density} = \frac{\text{Number of Elements}}{\text{Number of Pixels in the Cell}} \qquad (1)$$

The density (or cell information density) metric allows for generalization operators to be applied to different regions based on their density value. For example, in regions that are less dense, the computing device 200 can display more information or enlarge elements that are semantically more important.

FIG. 3G illustrates the distance metric. The distance between elements in the chart is measured using Euclidean distance. This metric assesses whether elements (e.g., annotations and associated data points) are too close. In FIG. 3G, the iPod label is sufficiently distant from other elements in the chart.

In some implementations, the distance metric is measured between similar elements within the same layer, such as labels or tick marks.

FIG. 3H illustrates the collision metric, which measures the extent to which elements are colliding, thereby contributing to visual clutter at the target size. In FIG. 3H, A(i, j) is the area of overlap between elements i and j. The Area equation in FIG. 3H computed the total overlap of all the elements.

FIG. 3I illustrates the area ratio metric. As the display size decreases, the proportion of area that elements occupy with respect to the area of the resized chart increases. The area ratio metric assesses the ratio of the total area of elements to the area of the entire visualization view, and is used to maintain the area of the more semantically important elements in the chart, deemphasizing the area of less important ones.

In some implementations, the area ratio is computed as follows $$\text{Area ratio} = \frac{\text{Area of elements}}{\text{Total display area}} \qquad (2)$$

Applying Generalization Operations

One of the goals of cartographic generalization is to maintain the recognizability of important elements, while deemphasizing less important information.

In some implementations, generalization operations based on the spatial metrics include jittering, elimination, simplification, and/or merging.

As illustrated in FIG. 3J, jittering is a technique for avoiding collisions between elements, by displacing elements from their original positions (e.g., labels). This is applied based on the density level of a given cell in the chart.

In some implementations, the jittering operation employs and extends a label placement simulated annealing algorithm that is disclosed by Wang et. al. in "A D3 plug-in for Automatic Label Placement Using Simulated Annealing" (2013), by adding additional heuristics:

A label should not overlap a data point.
A label should be located at the place that has the lowest information density.
A label's text-anchor should be updated based on the new position of the label.

Using FIG. 3F as an example, the computing device 200 determines a 3×3 density cell diagonally adjacent to a label anchor located in cell (i, j) with density computed using Equation (1). The 3×3 cell neighborhood is chosen because it provides a reasonable heuristic for determining visual clutter. The sum of each 3×3 density cell is computed as follows:

Northwest (NW)=$d(i-3\ldots i-1, j-3\ldots j-1)$

Northeast (NE)=$d(i+1\ldots i+3, j-3\ldots j-1)$

Southwest (SW)=$d(i-3\ldots i-1, j+1\ldots j+3)$

Southeast (SE)=$d(i+1\ldots i+3, j+1\ldots j+3)$ (3)

where d (a. . . b , c. . . d) denotes the sum of cell information density d(x, y) for all $a \leq x \leq b$ and $c \leq y \leq d$. The indices i and j correspond to cells where the anchor is located and the screen coordinates where the origin is, at the top-left. After calculating the sum of each of the four directions, the computing device 200 applies a jittering operation that calculates a new position that has the minimum density sum: min (NW, NE, SW, SE).

As illustrated in FIG. 3K, elimination is a technique of removing less important elements that overlap. A comparison of the data visualization before and after elimination shows that intermediate labels 302, 304, and 306 are removed as they are less important than other labels denoting start point, end points, and local maxima (or minima).

When the display size (and the visualization scale) is reduced, there is a high likelihood that too many elements will occupy a small area. This situation significantly increases both local information density and the likelihood of conflict. In some implementations, the computing device 200 computes a score S based on semantic importance for each element, to determine which of the elements ought to be removed:

$$S=(1-\text{imp}) \times W_{imp} + \text{local density} \times W_{dens} + \text{overlap} \times W_{OV}, \qquad (4)$$

wherein imp is the semantic importance, and $W_{imp}$, $W_{dens}$, and $W_{OV}$ are weights for the semantic importance, local density, and overlap constraints respectively.

FIG. 3L provides pseudocode for performing jittering and elimination operations.

As illustrated in FIG. 3M, simplification is a technique to reduce the complexity of a chart. In some implementations, the computing device 200 simplifies the data visualization (e.g., line chart) using the Douglas-Peucker algorithm line simplification method, which offers efficient compression ratios while retaining important visual features. FIG. 3M illustrates that the simplification process maintains the overall data shape, while preserving visually prominent features.

As illustrated in FIG. 3N, merging is a technique to reduce visual clutter by combining some of the elements together. In this example, the original yearly tick marks are merged (e.g., combined) to display tick marks at two-year intervals.

FIGS. 3O-3V illustrate applying the algorithm to a specific line chart. FIG. 3O shows the chart at its original size, and FIGS. 3P-3T show how the algorithm is applied as the display size gets progressively smaller. FIGS. 3U and 3V illustrate displaying the line chart at sizes larger than the original size. Note that the larger sizes would not fit within the image space, so they have been scaled to fit within the prescribed margins for a patent application.

FIGS. 4A-4G provide a flowchart of a method 400 for resizing visualizations based on semantics. The method 400 is also called a process.

The method 400 is performed (402) at a computing device 200 that has a display 212, one or more processors 202, and memory 214. The memory 214 stores (404) one or more programs configured for execution by the one or more processors 202. In some implementations, the operations shown in 3A to 3V correspond to instructions stored in the memory 214 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 400 may be combined and/or the order of some operations may be changed The computing device 200 generates (406) an initial data visualization according to a visual specification that specifies a data source, a plurality of visual variables, and a plurality of data fields from the data source.

In some implementations, the initial data visualization is (408) a line chart.

The computing device 200 determines (410) a visualization region based on a display size of the initial data visualization. For example, in some implementations, the visualization region includes a height, a width, and/or a number of pixels. In some implementations, the display size of the initial data visualization is based on the size of the display (e.g., based on a screen size of the display), or based on a graphical user interface or a dashboard in which the data visualization is displayed.

The computing device 200 generates (412) (e.g., on-the-fly, automatically, without user intervention) a modified data visualization from the initial data visualization according to the determined visualization region.

For example, in some implementations, the modified data visualization has the same visualization type as the initial data visualization (e.g., the initial and modified data visualizations are both line charts, or both bar graphs), but has a different size (e.g., a different height, width, and/or number of pixels) from the initial data visualization. In some implementations, the modified data visualization displays a subset of elements of the initial data visualization. In some implementations, the computing device generates the modified data visualization in accordance with a determination that the display size satisfies a first threshold condition (e.g., the display size is greater or less than a threshold size that is determined based on a display size of the initial data visualization).

In some implementations, generating (412) the modified data visualization from the initial data visualization according to the determined visualization region includes identifying (414) a plurality of (e.g., all) elements of the initial data visualization. For example, the elements of the data visualization can include labels, data marks, axes, tick marks, data points, annotations and associated data points, data fields, and/or data values of the data fields from which the initial data visualization is composed. In some implementations, the computing device 200 identifies at least a subset of the elements of the initial data visualization from the visual specification.

In some implementations, for each element of the identified elements, the computing device 200 computes (416) a respective bounding box for the respective element.

Referring to FIG. 4B, in some implementations, generating (412) the modified data visualization from the initial data visualization according to the determined visualization region includes: for each element of the identified plurality of elements, determining (418) (e.g., assigning, computing) a respective semantic weight for the respective element.

In some implementations, the computing device 200 determines (420) the respective semantic weight for each element according to a respective element type of the respective element. Each element type is (421) one of: a data element or a chart element. For example, a data element is an element corresponding to a data field and/or a data value of a data field of the initial data visualization. In some implementations, a chart element is an element corresponding to a chart feature, such as an axis or a tick mark.

In some implementations, when a first element is a data element, the computing device 200 assigns (422) a first semantic weight to the first element. When the first element is a chart element, the computing device 200 assigns (424) a second semantic weight to the first element. The second semantic weight is (426) different from (e.g., lower than or higher than) the first semantic weight.

In some implementations, when the first element is (428) a data element, the computing device 200 determines (430) whether the first element corresponds to a local extremum, a first data value, or a last data value. When the first element corresponds to a local extremum, a first data value, or a last data value, the computing device 200 assigns (432) a third semantic weight to the first element. The third semantic weight is (434) different from (e.g., higher than) the first semantic weight.

Referring to FIG. 4C, in some implementations, generating (412) the modified data visualization from the initial data visualization according to the determined visualization region includes grouping (436) (e.g., categorizing or organizing) the plurality of elements into one or more element layers according to the determined semantic weights. For example, in some implementations, the computing device 200 groups elements with the same assigned weight into the same element layer. In some implementations, the computing device 200 assigns each of the layers a value that ranges from 0.0 (lowest importance) to 1.0 (highest importance).

In some implementations, generating (412) the modified data visualization from the initial data visualization according to the determined visualization region includes computing (438) one or more spatial metrics for the plurality of elements (e.g., to reduce or minimize clutter in the initial data visualization).

In some implementations, the one or more spatial metrics include (440) a data density metric (e.g., cell information density). In some implementations, the computing device 200 divides (444) the visualization region into a plurality of cells (e.g., all of the cells have a uniform size). For each cell, the computing device 200 computes (446) (e.g., determines) a respective data density metric based on a respective number (e.g., count) of identified elements in the respective cell.

In some implementations, the computing device 200 divides the visualization region into a plurality of sub-regions and determines a respective data density for each of the sub-regions. Computing data density for sub-regions allows for generalization operators to be applied to different sub-regions based on their data density. For example, the computing device 200 can show more information, or enlarge elements that are semantically more important in sub-regions that are determined to be less dense.

In some implementations, the one or more spatial metrics include (448) a distance metric. The computing device computes (450) the distance metric by determining distances (e.g., Euclidean distance) between elements within an element layer (e.g., within the same element layer).

In some implementations, the one or more spatial metrics include (452) a collision metric. Computing the collision metric includes (454): computing (456) (e.g., determining) a respective bounding box for each element of the plurality of identified elements; and, for at least some pairs of elements, computing (458) a respective area of overlap (e.g., using the Area equation as illustrated in FIG. 3H) of bounding boxes for elements in the respective pair of elements.

In some implementations, the one or more spatial metrics include (460) an area ratio metric (e.g., Equation (2)). Computing the area ratio metric comprises (462) computing a ratio of (1) an area of all the identified elements and (2) an area of the visualization region.

In some implementations, generating (412) the modified data visualization from the initial data visualization according to the determined visualization region includes executing (464) one or more generalization operations (e.g., applying one or more generalization operators) on the plurality of elements in accordance with the one or more computed spatial metrics.

In some implementations, the one or more generalization operations include (466) a jittering operation. When the computed area of overlap between a first element (e.g., a label) and a second element (e.g., a datapoint) is a positive number (e.g., a non-zero number or a positive real number), the computing device 200 executes (468) the jittering operation so that the first element is displaced from an original position (in the initial data visualization) to a modified position (in the modified data visualization).

In some implementations, executing the one or more generalization operations includes executing (470) an elimination operation. Executing the elimination operation includes: for each element of the identified elements, computing (472) a respective score for the respective element based on a respective plurality of assigned weights for the respective element. In some implementations, the respective plurality of assigned weights for the respective element includes (474) the respective semantic weight, a respective local density weight, and a respective overlap weight. In some implementations, executing the elimination operation also includes identifying (476) one or more elements, from the plurality of elements, whose computed scores are below a predetermined threshold; and removing (478) the identified one or more elements from the initial data visualization. The modified data visualization excludes (480) the one or more identified elements.

In some implementations, executing the one or more generalization operations includes executing (482) a simplification operation, including: determining (484) a data shape (e.g., overall data shape) of the initial data visualization, and removing (486) data points from the initial data visualization (e.g., by executing a Douglas-Peucker algorithm) while preserving (e.g., retaining) the data shape of the initial data visualization.

In some implementations, the simplification operation preserves (488) (e.g., all of) local extremum values of the initial data visualization, initial data points of the initial data visualization, and end data points of the initial data visualization.

In some implementations, executing the one or more generalization operations includes executing (490) a merging operation that combines two or more of the plurality of elements.

The computing device 200 displays (492) the modified data visualization.

In some implementations, a first element of the plurality of elements has (494) a higher semantic importance than a second element of the plurality of elements. Displaying the modified data visualization includes displaying (496) the first element more prominently (e.g., with a larger font size, larger data mark, visually emphasized) than the second element.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising,"
when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

What is claimed is:

1. A method for resizing data visualizations based on semantics, comprising:
   at a computing device having a display, one or more processors, and memory storing one or more programs configured for execution by the one or more processors:
      generating an initial data visualization according to a visual specification that specifies a data source, a plurality of visual variables, and a plurality of data fields from the data source;
      determining a visualization region based on a display size of the initial data visualization;
      generating a modified data visualization from the initial data visualization according to the determined visualization region, including:
         identifying a plurality of elements of the initial data visualization;
         for each element of the identified plurality of elements, determining a respective semantic weight for the respective element;
         grouping the plurality of elements into one or more element layers according to the determined semantic weights;
         computing one or more spatial metrics for the plurality of elements; and
         executing one or more generalization operations on the plurality of elements in accordance with the one or more computed spatial metrics; and
      displaying the modified data visualization.

2. The method of claim 1, wherein the respective semantic weight for each element is determined according to a respective element type of the respective element, wherein each element type is either a data element or a chart element.

3. The method of claim 2, further comprising:
   in accordance with a determination that a first element is a data element, assigning a first semantic weight to the first element; and
   in accordance with a determination that the first element is a chart element, assigning a second semantic weight to the first element, wherein the second semantic weight is different from the first semantic weight.

4. The method of claim 3, further comprising:
in accordance with a determination that the first element is a data element:
determining whether the first element corresponds to a local extremum, a first data value, or a last data value; and
in accordance with a determination that the first element corresponds to a local extremum, a first data value, or a last data value, assigning a third semantic weight to the element, wherein the third semantic weight is different from the first semantic weight.

5. The method of claim 1, further comprising:
for each element of the identified plurality of elements, computing a respective bounding box for the respective element.

6. The method of claim 1, wherein the one or more spatial metrics include a data density metric; and
computing the data density metric includes:
dividing the visualization region into a plurality of cells; and
for each cell, computing a respective data density value based on a respective number of identified elements in the respective cell.

7. The method of claim 1, wherein the one or more spatial metrics include a distance metric; and
computing the distance metric includes determining distances between pairs of elements within an element layer.

8. The method of claim 1, wherein the one or more spatial metrics include a collision metric; and
computing the collision metric includes:
computing a respective bounding box for each element of the plurality of identified elements; and
for at least some pairs of elements, computing a respective area of overlap of bounding boxes for elements in the respective pair of elements.

9. The method of claim 8, wherein:
the one or more generalization operations include a jittering operation; and
the method further comprises:
in accordance with a determination that the computed area of overlap between a first element and a second element is a positive number, executing the jittering operation so that the first element is displaced from an original position to a modified position.

10. The method of claim 1, wherein:
the one or more spatial metrics include an area ratio metric; and
computing the area ratio metric comprises computing a ratio of (1) an area of all the identified elements and (2) an area of the visualization region.

11. The method of claim 1, wherein:
executing the one or more generalization operations includes executing an elimination operation, comprising:
for each element of the identified elements, computing a respective score for the respective element based on a respective plurality of assigned weights for the respective element;
identifying one or more elements, from the plurality of elements, whose computed scores are below a predetermined threshold; and
removing the identified one or more elements from the initial data visualization,
wherein the modified data visualization excludes the one or more identified elements.

12. The method of claim 11, wherein the respective plurality of assigned weights for the respective element include the respective semantic weight, a respective local density weight, and a respective overlap weight.

13. The method of claim 1, wherein:
executing the one or more generalization operations includes executing a simplification operation, comprising:
determining a data shape of the initial data visualization; and
removing data points from the initial data visualization while preserving the data shape of the initial data visualization.

14. The method of claim 13, wherein the simplification operation preserves (i) local extremum values of the initial data visualization, (ii) initial data points of the initial data visualization, and (iii) end data points of the initial data visualization.

15. The method of claim 1, wherein:
executing the one or more generalization operations includes executing a merging operation that combines two or more of the plurality of elements.

16. The method of claim 1, wherein:
a first element of the plurality of elements has a higher semantic importance than a second element of the plurality of elements; and
displaying the modified data visualization includes displaying the first element more prominently than the second element.

17. The method of claim 1, wherein the initial data visualization is a line chart.

18. A computing device, comprising:
a display;
one or more processors; and
memory coupled to the one or more processors, the memory storing one or more programs configured to be executed by the one or more processors, the one or more programs including instructions for:
generating an initial data visualization according to a visual specification that specifies a data source, a plurality of visual variables, and a plurality of data fields from the data source;
determining a visualization region based on a display size of the initial data visualization;
generating a modified data visualization from the initial data visualization according to the determined visualization region, including:
identifying a plurality of elements of the initial data visualization;
for each element of the identified plurality of elements, determining a respective semantic weight for the respective element;
grouping the plurality of elements into one or more element layers according to the determined semantic weights;
computing one or more spatial metrics for the plurality of elements; and
executing one or more generalization operations on the plurality of elements in accordance with the one or more computed spatial metrics; and
displaying the modified data visualization.

19. The computing device of claim 18, wherein the one or more spatial metrics include a data density metric; and
computing the data density metric includes:

dividing the visualization region into a plurality of cells; and for each cell, computing a respective data density value based on a respective number of identified elements in the respective cell.

20. A non-transitory computer-readable storage medium storing one or more programs, the one or more programs comprising instructions, which when executed by a computing device, cause the computing device to perform operations comprising:

generating an initial data visualization according to a visual specification that specifies a data source, a plurality of visual variables, and a plurality of data fields from the data source;

determining a visualization region based on a display size of the initial data visualization;

generating a modified data visualization from the initial data visualization according to the determined visualization region, including:
identifying a plurality of elements of the initial data visualization;
for each element of the identified plurality of elements, determining a respective semantic weight for the respective element;
grouping the plurality of elements into one or more element layers according to the determined semantic weights;
computing one or more spatial metrics for the plurality of elements; and
executing one or more generalization operations on the plurality of elements in accordance with the one or more computed spatial metrics; and displaying the modified data visualization.

* * * * *